(12) United States Patent
Kurganov

(10) Patent No.: US 12,271,574 B1
(45) Date of Patent: Apr. 8, 2025

(54) METHOD AND SYSTEM FOR HIGHLY INTUITIVE, ERROR-FREE, DIGITAL CONSTRUCTION OF INTELLIGENT INTERACTIVE VOICE RESPONSE (IVR) FOR PERSONAL AND ENTERPRISE USE

(71) Applicant: RTC Logic LLC, Hudson, NH (US)

(72) Inventor: Alexander Kurganov, Hudson, NH (US)

(73) Assignee: RTC Logic LLC, Hudson, NH (US)

( * ) Notice: Subject to any disclaimer, the term of this patent is extended or adjusted under 35 U.S.C. 154(b) by 0 days.

(21) Appl. No.: 18/333,441

(22) Filed: Jun. 12, 2023

Related U.S. Application Data

(60) Provisional application No. 63/351,256, filed on Jun. 10, 2022.

(51) Int. Cl.
*G06F 3/0482* (2013.01)
*G06F 3/0486* (2013.01)
*G06F 40/10* (2020.01)

(52) U.S. Cl.
CPC .......... *G06F 3/0482* (2013.01); *G06F 3/0486* (2013.01); *G06F 40/10* (2020.01)

(58) Field of Classification Search
CPC .................................................. G06F 3/048–05
See application file for complete search history.

(56) References Cited

U.S. PATENT DOCUMENTS

| | | | |
|---|---|---|---|
| 6,335,964 B1 * | 1/2002 | Bowater | H04M 3/493 |
| | | | 379/88.16 |
| 11,089,158 B1 * | 8/2021 | Holland | H04M 3/5183 |

(Continued)

FOREIGN PATENT DOCUMENTS

| | | | | |
|---|---|---|---|---|
| CN | 113076097 A | * | 7/2021 | G06F 8/34 |

OTHER PUBLICATIONS

English Translation for CN-113076097 published on Jul. 6, 2021 (Year: 2021).*

*Primary Examiner* — Daniel Rodriguez
(74) *Attorney, Agent, or Firm* — Patent Law Works LLP

(57) ABSTRACT

The present invention discloses a system and methods for providing an innovative and intuitive interactive voice response ("IVR") builder web application with a "drag-and-drop" type graphical user interface ("GUI") for rapid, error-free, digital creation and implementation of IVR systems. The present invention requires no coding by users to create the intelligent, natural speech and/or DTMF IVR by any non-technical enterprise or individual user. Once constructed using any web or mobile interface, the IVR code can be deployed to any mobile or landline user phone number provider via any available API to run on all or some received inbound or initiated outbound calls by the user who owns that phone number. The system and methods include smart (or intelligent), easily manipulated (e.g., draggable) and configurable visual interlocking IVR building blocks with underlying software algorithms, various software frameworks and middleware, external systems API handlers, at least one Voice-over-IP ("VOIP") media switch, and a database (one or more, distributed or otherwise). The blocks represent IVR components including, but not limited to, audio prompts, menus, caller input handlers, telephone call handlers, logical operators, date-and-time handlers, variables, transition handlers, etc. The blocks interlock (e.g., when dragged by the user) only if their combination represents a valid IVR sequence as verified by the underlying software algorithms, thus providing an intuitive user interface for error-free IVR construction for use by an enterprise, business, or individuals.

20 Claims, 11 Drawing Sheets

(56) References Cited

U.S. PATENT DOCUMENTS

| | | | |
|---|---|---|---|
| 11,368,587 B1* | 6/2022 | Moreno | H04M 3/5191 |
| 11,550,565 B1* | 1/2023 | VanAntwerp | G06Q 10/067 |
| 2002/0057678 A1* | 5/2002 | Jiang | H04L 67/565 |
| | | | 370/465 |
| 2007/0157088 A1* | 7/2007 | Lewis-Bowen | G06Q 10/06 |
| | | | 715/700 |
| 2008/0120111 A1* | 5/2008 | Doyle | G06F 8/34 |
| | | | 704/E15.021 |
| 2009/0019352 A1* | 1/2009 | Afshar | G06F 8/34 |
| | | | 717/136 |
| 2011/0185315 A1* | 7/2011 | Armour | G06F 8/34 |
| | | | 715/853 |
| 2015/0350443 A1* | 12/2015 | Kumar | G06F 3/04842 |
| | | | 379/265.13 |
| 2016/0370952 A1* | 12/2016 | Karnewar | H04W 4/16 |
| 2018/0046984 A1* | 2/2018 | Brophy | H04L 51/02 |
| 2021/0136202 A1* | 5/2021 | Paiva | H04M 3/42161 |
| 2021/0136203 A1* | 5/2021 | Paiva | H04M 3/4933 |
| 2021/0136210 A1* | 5/2021 | Paiva | H04M 3/5166 |
| 2021/0136214 A1* | 5/2021 | Paiva | G06F 3/0482 |
| 2021/0136217 A1* | 5/2021 | Paiva | G10L 15/22 |
| 2024/0152847 A1* | 5/2024 | Jayapathi | H04L 41/0816 |

* cited by examiner

User Constructing Personal Error-free IVR Phone Number Provider Use Case Flow

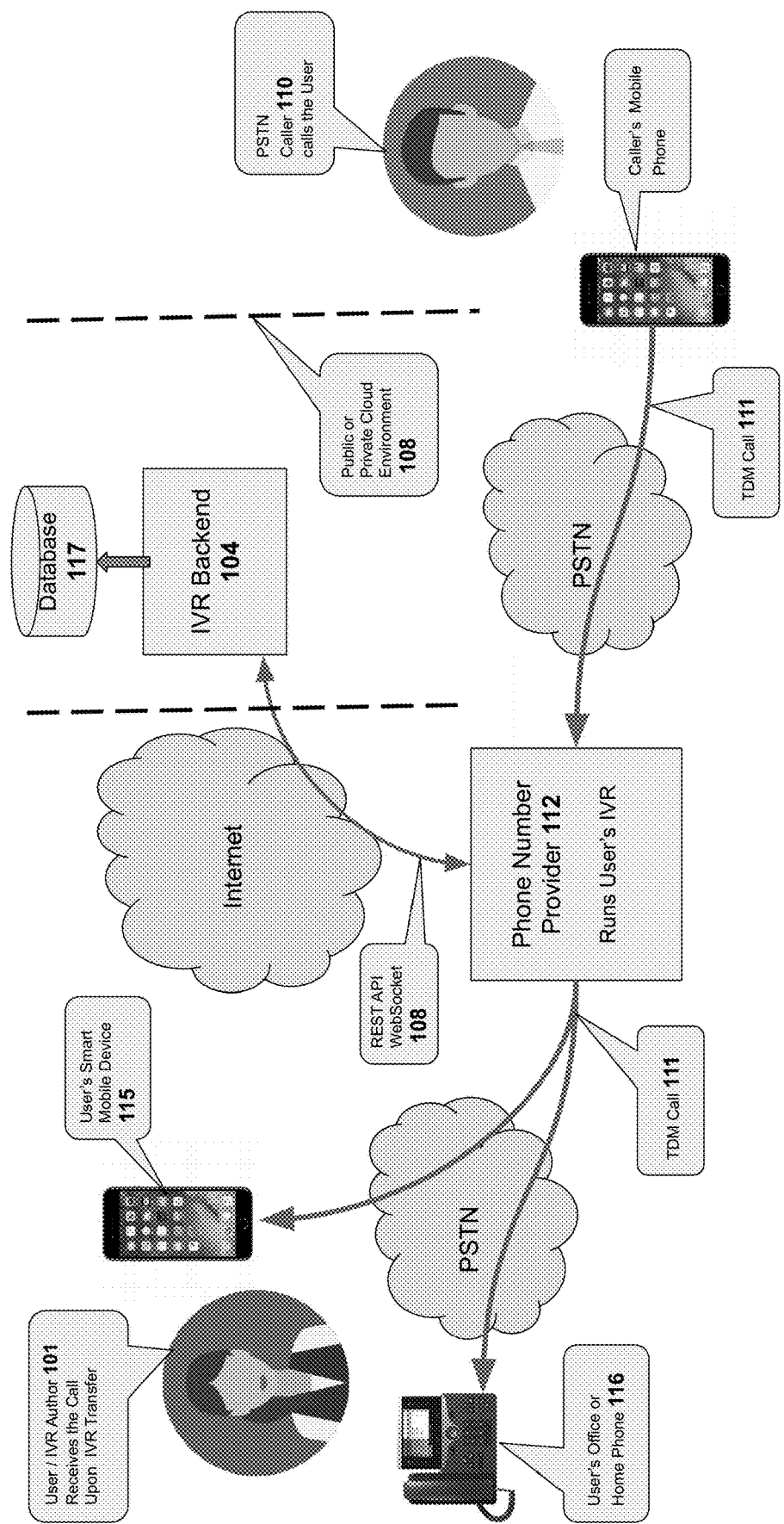

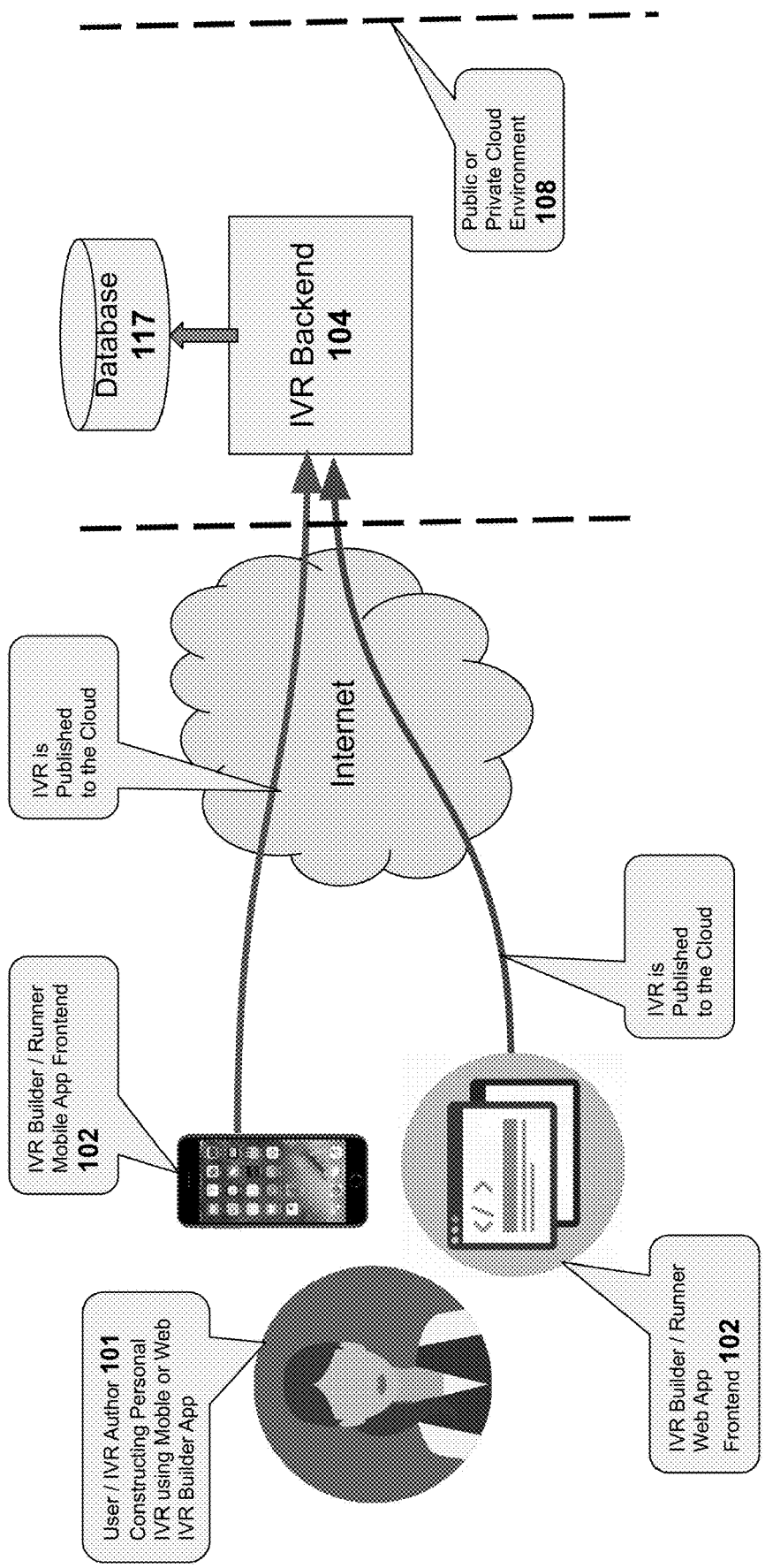

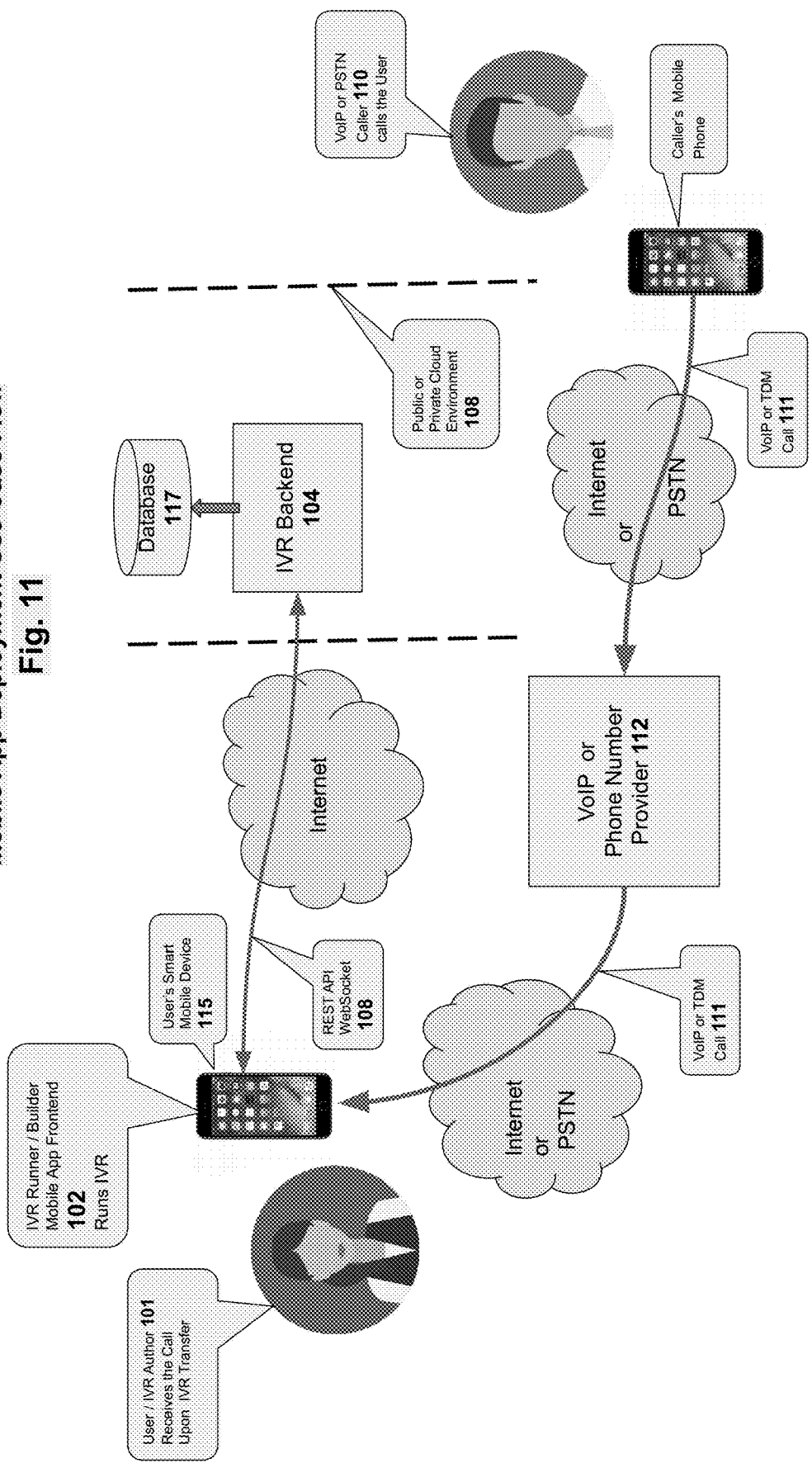

METHOD AND SYSTEM FOR HIGHLY INTUITIVE, ERROR-FREE, DIGITAL CONSTRUCTION OF INTELLIGENT INTERACTIVE VOICE RESPONSE (IVR) FOR PERSONAL AND ENTERPRISE USE

CROSS REFERENCE TO RELATED APPLICATION

This application claims priority under 35 USC § 119 (e) to provisional patent application U.S. Application Ser. No. 63/351,256, titled "System and Methods for Creating and Implementing Intuitive Interactive Voice Response" filed on Jun. 10, 2022, the entirety of which provisional application is incorporated by reference herein.

BACKGROUND OF THE INVENTION

1. Field of the Invention

The present invention relates generally to interactive voice response ("IVR") technology, and more specifically, to a system and methods for creating, generating, and/or implementing dynamic interactive voice response programs and interfaces that are intuitive, efficient, error-free, and may be easily and digitally constructed or customized by an organization, enterprise, business, or any person, whether technically inclined or not, within in-cloud architectures of IVR systems or mobile applications, by non-technical and technical users. The system and methods described here, more particularly, digitally and intuitively, enable constructions of error-free, IVR applications and flows rapidly and effectively, and include, but are not limited to, a unique graphical-user interface ("GUI") that allows the highly intuitive, efficient, and error-free construction of IVR applications.

2. Description of the Prior Art

Interactive Voice Response ("IVR") technology is widely used by companies and enterprises of any and all sizes, from small, medium, and large companies, in various industries, to offer an efficient "over-the-phone" interface to their callers to accomplish many tasks, for example, from providing information, resolving issues and connecting to the right destination or source.

An IVR system is often designed by engineers and software experts to try and automate as many calls as possible to reduce the cost of providing "over-the-phone" support service to many customers in their communications with services they use in their daily lives. In many scenarios, the objective of IVR is to attempt to automatically handle more routine customer calls, such as inquiries about "hours of operation," and to route all other calls to the right support agents, departments, or employees when necessary.

Typically, an IVR system guides callers via audio prompts, by providing a "menu" of available options. For example, a menu may offer instructions for the caller to press certain keys on the telephone keypad or simply speak a number or a command to hear directions to the company office, connect to the billing department, or dial an employee extension. If a large number of options are offered, the IVR system executes a "tree-like" menu structure, by a decisioning logic, to help callers narrow down their choices and navigate from more general options menus to more specific ones, as provided by the various branches of the decision tree.

IVR technology has been in use for decades. Yet, the design and development of even relatively simple IVR applications involves significant costs and often requires specific technical expertise. Over the years, there have been many advanced IVR development frameworks created that offer graphical tools with the aim to simplify and reduce the cost of the IVR development process.

However, there are still problems with the currently offered IVR development tools. Non-graphical IVR tools, such as VoiceXML, are intended for use by software developers, and therefore, require expertise that consequently results in high IVR development and maintenance costs. These high costs are especially problematic for small-to-medium-size ("SMB") businesses with no software developers skilled in IVR on their staff. SMB often may require a relatively simple IVR application, and it is not economical for them to hire highly skilled IVR developers to develop their IVR systems and to maintain them.

Other, older, non-graphical IVR development tools may use linked tables that are filled with IVR-specific data. These tools do not offer visualization of IVR flow, have poor usability, and are being replaced with more modern IVR tools with GUI.

On the other hand, currently available graphical IVR development tools intended for use by non-technical personnel have their own set of problems. Specifically, the current graphical IVR tools implement a construction process that is rather non-intuitive, has no way to prevent errors by users, and requires training that can be challenging for non-technical personnel. By way of example, consider an example of a screen from a modern, state-of-the-art graphical IVR development tool offered by the leading voice service provider, Twilio. This example serves to illustrate an example of a simple IVR, which is not intuitively clear to a non-technical user. While using it, a non-technical user is not able to easily fathom what the system is doing, simply by looking at visual representations on the screen. It can take a non-technical user or employee, a significant amount of time to fully understand the functions involved.

One of the aspects of this kind of tool that leads to confusion, is the poor visualization of the IVR flow, due largely to a large number of connectors between the IVR blocks. The more IVR blocks there are, the more connectors there are. All other currently available graphical IVR development tools suffer from these same shortcomings, some of which are described here. For example, existing IVR development tools are non-intuitive construction processes that are hard to understand for non-technical personnel. They are typically error-prone, analog-like IVR construction processes that do not automatically prevent a certain class or type of user errors, for example, making incorrect menu options. In many instances, there are unprocessed user input errors. In other instances, there are forgotten or incorrect configurations, incorrect call flows, and the like.

Another drawback resides in the flow-charting paradigm used in these processes, resulting in a large number of connectors with every extra IVR block. In many instances of use, the connectors obscure the view and make it difficult to understand the IVR flow visually. Yet another problem is the number of low-level elements and actions, which take significant time for a non-technical person, such as small business analyst, to learn and assemble into a working IVR.

Accordingly, the existing technologies have various limitations. Hence, techniques are desired for providing enhanced telephony and interactive voice response systems and methods.

SUMMARY OF THE INVENTION

The present invention overcomes the deficiencies and limitations of prior systems and methods, at least in part by, providing a system and methods configured to enable or operate an enhanced interactive voice response system provided and described in accordance with embodiments of the present invention. This interactive voice response system is configured for creating, generating, and/or implementing dynamic interactive voice response construction processes and interfaces that are intuitive, efficient, error-free, and may be easily adopted by an organization, enterprise, business, or any person, whether technically inclined or not, and deployed within any public or private in-cloud architectures of various service providers (such as landline or mobile carriers), by non-technical and technical users In accordance with one aspect of the present invention, the system and methods of the present invention provide an innovative, intuitive interactive voice response ("IVR") builder system architecture and web and mobile applications with a "drag-and-drop" type graphical user interface ("GUI") for fast implementation of IVR applications.

The system and methods in some web-based embodiments include smart, draggable and configurable visual interlocking IVR building blocks with underlying software algorithms including machine learning algorithms designed to train the blocks, various software frameworks and middleware, external systems API handlers, at least one internal or external Voice-over-IP ("VOIP") media switch, and a database. These blocks represent IVR components and functions including, but not limited to, audio prompts, menus, caller natural speech and touch-tone input handlers, phone call handlers, logical operators, date and time handlers, variables, transition handlers, and the like. These blocks are configured to interlock (when dragged by the user to an appropriate position or location) only if their combination represents a valid IVR sequence, as verified by the underlying software algorithms. In some instances, the underlying software algorithms may include machine learning algorithms and models. As is recognized by those skilled in the art, the machine learning algorithms and models may be trained by data sets compiled by continuous use by users. Thus, this capability provides an intuitive ever improving user interface for an error-free, IVR construction.

In accordance with some aspects of the present invention, the interactive voice response system builder and graphical user interface (GUI) enable digital construction of error-free, intelligent IVR applications with natural speech and/or touch-tone interfaces by any non-technical enterprise or individual user. Once constructed using any web or mobile interface, the IVR code may be easily and seamlessly deployed to any mobile or landline user phone number service provider via any available application programming interface ("API") to run on all or some received inbound or initiated outbound calls by the user who owns that telephone number.

In accordance with some mobile embodiments, the method and system may include smart, draggable and configurable visual, error-free, interlocking IVR building blocks with underlying software algorithms, various software frameworks and middleware, external systems API handlers, at least one internal or external Voice-over-IP (VOIP) media switch, and a database. The blocks represent IVR components including, but not limited to, audio prompts, menus, caller natural speech and/or touch-tone intelligent input handlers, telephone call handlers, logical operators, date and time handlers, variables, transition handlers, and the like. The blocks are configured to interlock (when dragged by the user), only if their combination represents a valid, error-free IVR sequence as verified by the underlying software algorithms, thus providing an intuitive user interface for error-free, digital IVR construction.

BRIEF DESCRIPTION OF THE DRAWINGS

The present invention is illustrated by way of example, and not by way of limitation in the figures of the accompanying drawings in which like reference numerals are used to refer to the same or similar elements.

FIG. 9 is a blow diagram illustrating a user's personal, error-free, IVR program operating in a telephone number provider environment according to at least one embodiment of the present invention;

FIG. 10 is a block diagram illustrating a user-initiated, personal, error-free, IVR construction process for mobile app deployment according to at least one embodiment of the present invention;

FIG. 11 is a block diagram illustrating a user's personal, error-free, IVR operating as a mobile app according to one embodiment of the present invention.

It is to be understood that the attached drawings are for purposes of illustrating the concepts of the invention and may not be to scale, and are not intended to be limiting in terms of the range of possible shapes and/or proportions.

DETAILED DESCRIPTION OF THE INVENTION

The present invention is now described more fully hereinafter with reference to the accompanying figures, in which embodiments of the present invention are shown. This invention may, however, be embodied in many alternate forms and should not be construed as limited to the embodiments set forth herein.

The following detailed description of illustrated embodiments of the present invention include references to block diagrams and other relevant illustrations that relate to a method and a system for a highly intuitive implementation of IVR using a builder or construction web application comprising "smart" or intelligent, interlocking IVR blocks (hereinafter referred to as "smart blocks") with a drag-and-drop type graphical user interface ("GUI"). As should be recognized by one skilled in the art, a graphical user interface is a capability that allows a user to perform operations by moving the screen icon of an object into another window or onto another icon.

Figure 1:
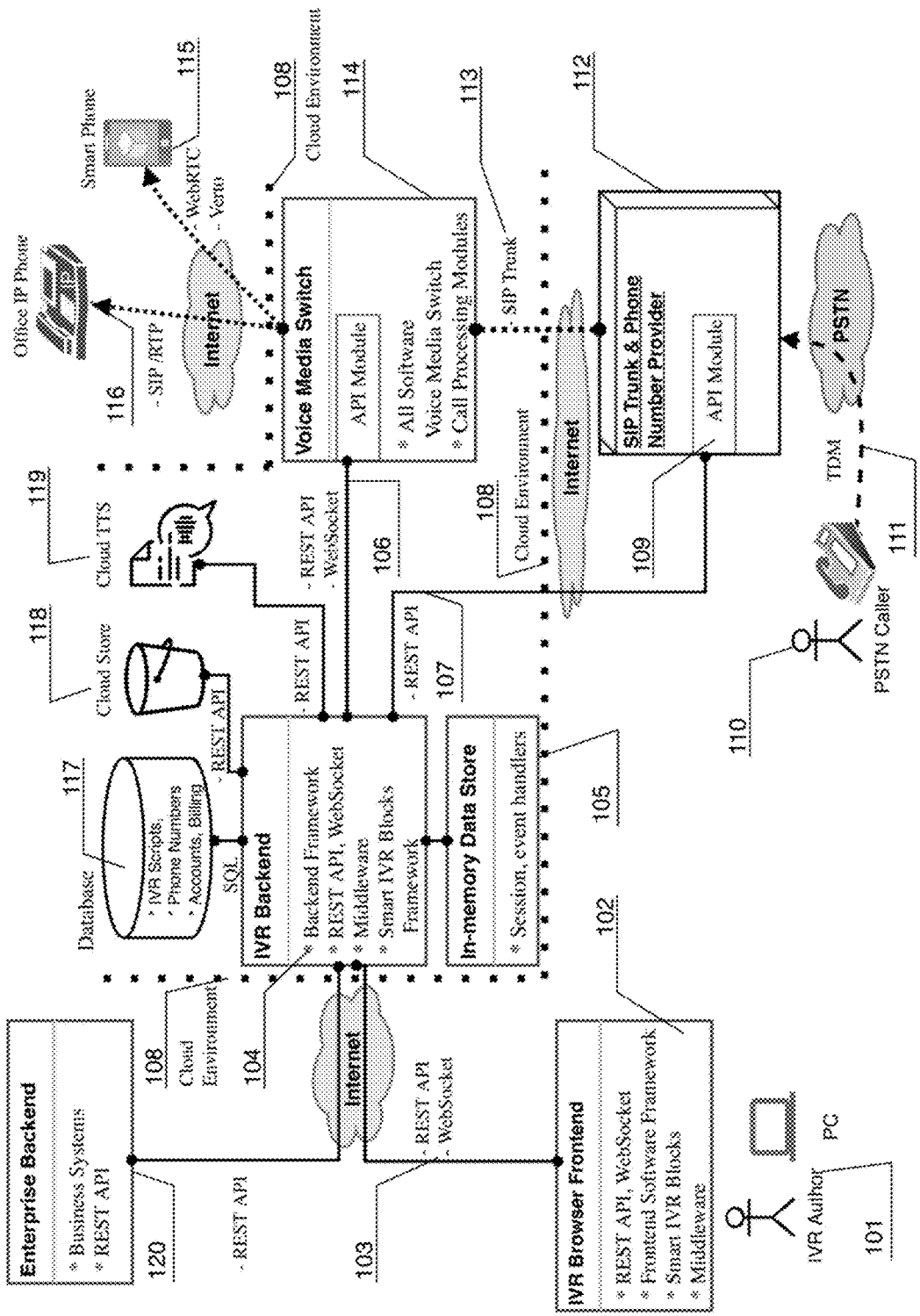
FIG. 1 is a high-level block diagram illustrating an example IVR builder or construction computer system that is configured to create, generate, implement, and/or execute interactive voice response (otherwise referred to as an "IVR builder") according to at least one embodiment of the present invention.
Figure 2:
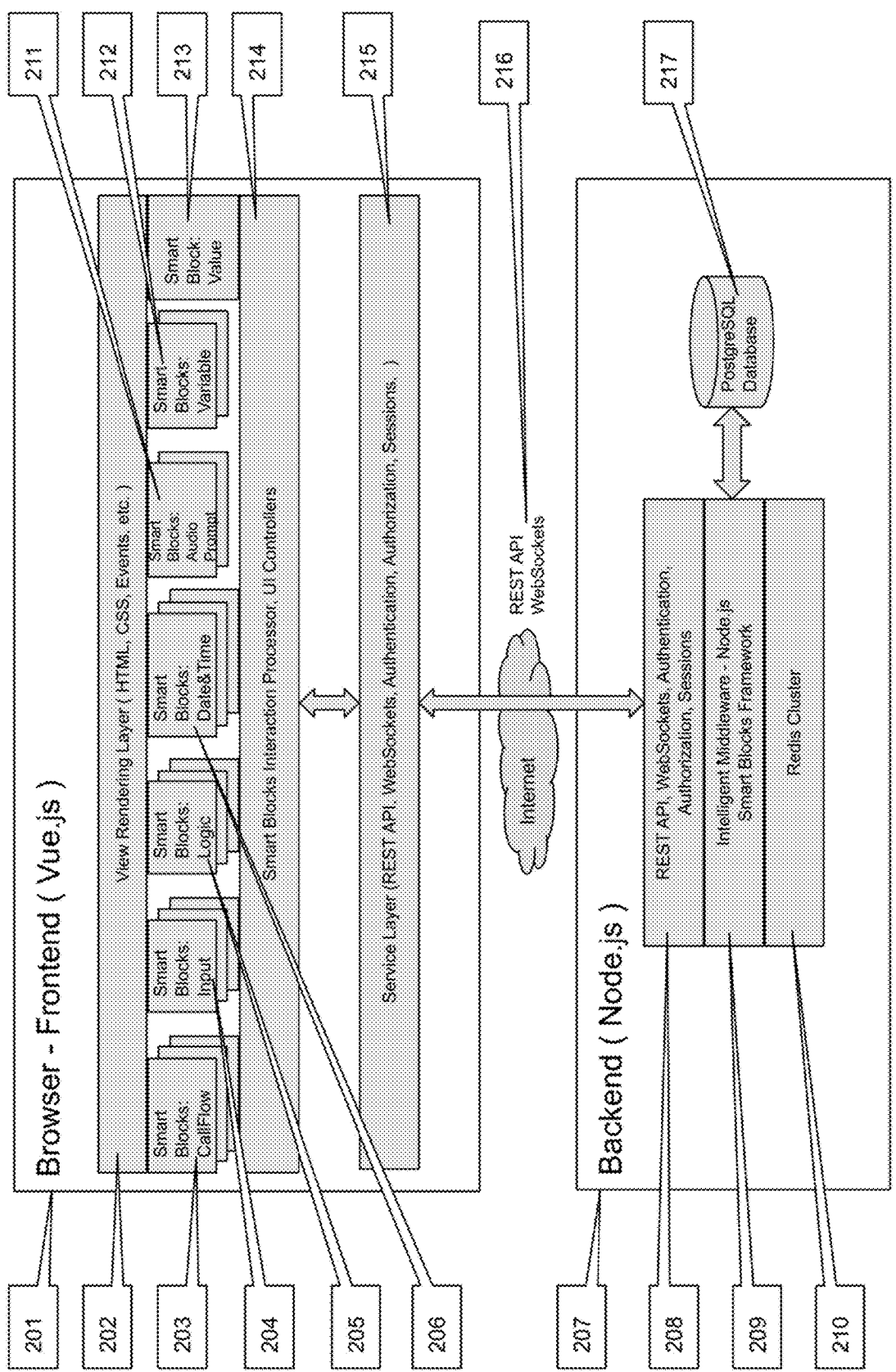
FIG. 2 is a block diagram illustrating one example of a system, a method, and a software architecture of the IVR builder or construction system comprising interlocking "smart" (or intelligent) IVR blocks that may be implemented or executed according to at least one embodiment of the present invention.

Referring now to FIG. 1, a block diagram illustrates an IVR builder computer system architecture comprising both hardware and software system components that are configured to enable users to quickly create intuitive, graphical, "smart" block "drag-and-drop-based" IVR application scripts, which enable run-time computer execution of programmable IVR scripts according to some embodiments of the invention.

The IVR builder system components illustrated here describe the process by which "IVR" application scripts may be quickly created, followed by the description of the IVR script run-time or operation computer execution. As shown in FIG. 1, in an example environment, an "IVR Author" designated by reference numeral 101, is for example, a person creating or building a particular IVR program. The IVR author 101 may use a personal or other computer ("PC") with a standard web browser, such as "Chrome" or the like, which runs a number of software components as part of an IVR Browser Frontend designated by reference numeral 102. The software components of the IVR builder illustrated, include various "smart" IVR blocks, which are presented visually to the IVR Author 101 in the browser window, enabling the IVR Author 101 to manipulate them to build a particular IVR program, as desired. The software components may be deployed within any standard browser-oriented web frontend software framework environment, such as Vue.js, ReactJS, or AngularJS. The "smart" IVR blocks (illustrated and described in more detail below) are based on a software framework with some foundational features and capabilities, such as enabling or disabling "block" interlocking, "block" configuration, "block" inputs and outputs, "block" user interface and style, or the like.

In some embodiments, the IVR Author 101 may use an IVR mobile App. In this mobile scenario, the software components include various "smart" IVR blocks which are presented visually to the IVR Author 101 in the mobile application ("app") window, enabling the IVR Author 101 to manipulate them to build the IVR by interacting with the mobile app. The software components may be deployed within any mobile software framework environment, such as Swift, Kotlin, ReactNative, Flutter, or the like. The smart IVR blocks (illustrated and described in more detail below) are based on a software framework with some foundational features and capabilities, such as enabling or disabling "block" interlocking, "block" configuration, "block" inputs and outputs, "block" user interface and style, or the like.

In accordance with some embodiments of the current invention, the above-mentioned foundational block features and capabilities are extended to create innovative smart blocks with IVR-specific internal logic, to enable this entirely new approach for the construction of IVR applications.

The smart IVR blocks of IVR Browser Frontend 102 interface include special middleware that is also part of the Browser Frontend 102. The frontend middleware enables a number of important features including, but not limited to, functions including, verification of correctness or accuracy of the entire IVR tree assembled from use of smart IVR blocks, conversion of the assembled IVR tree data into a special format understood by the server-side smart IVR block framework, and the handling of the interaction between IVR Browser Frontend 102 and IVR Backend 104. The IVR Browser Frontend 102 interfaces with the server-side IVR Backend 104 over any IP network using any suitable standard web protocols, such as REST API and WebSocket protocols used in some embodiments of the current invention as referenced by 103 in FIG. 1.

The IVR Backend software 104 used in some embodiments of the current invention may be deployed or implemented on one or more computers running or operating any standard operating system, such as Linux, whether directly on the computer hardware, or in any virtual machine environment. The IVR Backend 104 software components include, but are not limited to, a backend software framework, a backend middleware, and a smart IVR blocks framework. The backend software framework comprises a plurality of standard and custom software modules to enable required backend functions, such as interfacing external systems via REST API and WebSocket events. The Backend Middleware enables interaction of various IVR Backend 104 software components, as well as orchestrating communications with external systems. The smart IVR blocks framework enables IVR blocks configuration, validation, assembly into IVR scripts, IVR script compilation into executable computer code and its persistent storage.

As illustrated in FIG. 1, in some embodiments of the present invention, the IVR Backend 104 interacts with an In-memory Data Store 105, which securely handles web sessions initiated by the IVR Authors 101, which further generate various events, such as timeout expirations, and is generally used as a temporary data storage. A database 117 in some embodiments of the present invention is used for persistent data storage, including but not limited to user accounts, telephone numbers, compiled IVR scripts code, billing data, etc. A cloud store 118 in some embodiments of the present invention is used to store binary data, including, but not limited to: user profile photos, IVR prompts audio files, and the like.

To continue, consider a description of the IVR application script creation process, which is enabled by some of the software components illustrated on FIG. 1 and described above. The IVR Author 101 may start an IVR application script construction operation or process by accessing the IVR builder web application using any standard web browser. According to some embodiments of the current invention, the initial step in the IVR application script construction process requires the IVR Author 101 to use the IVR builder web application to link the IVR application script to one or more telephone numbers or SIP addresses provisioned through a telephone number and a SIP trunk service provider 112. The provisioning is further described below as part of the IVR script run-time computer execution description.

In another embodiment of the present invention (described in greater detail below) the IVR Author 101 may perform IVR construction using a mobile application running on a mobile smart device, such as any that is widely used.

The IVR builder functionality provided by the IVR Browser Frontend 102 and the IVR Backend 104 permits intuitive and an error-free assembly of interlocking "smart" or intelligent IVR blocks into a functional IVR application script using a drag-and-drop graphical user interface ("GUI"). For example, the audio "play prompt" block can be inserted into and interlocked with the IVR "menu" block. Any pair of IVR smart blocks' ability to interlock is disabled if it results in an invalid IVR block assembly as determined by the blocks underlying algorithms. This helps the IVR Author 101 to avoid many common IVR construction mistakes. Some smart IVR blocks have configuration settings that may be selected during the construction process. For example, the audio "play prompt" smart IVR block provides language settings to enable multilingual IVR scripts. Once the IVR script construction is completed, the IVR Author 101 initiates the IVR script submission to the backend. At that point, the IVR Browser Frontend 102 middleware runs or operates the initial validation of the IVR script. For example, it may check if the IVR smart block assembly is complete, and if all IVR smart blocks in the assembly are properly configured. The valid IVR script is then converted into a compact format understood by the Smart IVR Blocks Framework of the IVR Backend 104, and transfers the formatted script to the IVR Backend via REST API 103.

At the next stage of the process, the smart IVR blocks framework of the IVR Backend 104 converts the formatted script into an internal logical format and runs the final IVR script validation. Upon successful validation, the IVR script in the internal logical format is compiled into executable computer code. The compilation may include, but is not limited to, such actions as interaction with the Cloud Text-to-Speech ("TTS") service 119 to convert text used in all the smart IVR audio "play prompt" blocks within the IVR script into binary audio files, and saving the audio files in the cloud store 118. This ensures efficient execution of audio prompt playback during run time by avoiding repeat TTS service use. Saving the executable computer code of a compiled IVR script in database 117 completes the IVR application script construction process. At that point, the IVR script is ready to run to serve calls received by the telephone numbers linked to that particular script.

At the next stage, consider the run-time computer execution of compiled IVR application scripts built according to some embodiments of the current invention. The compiled IVR script execution is enabled by several computer system components illustrated in FIG. 1. According to some embodiments of the present invention, IVR application scripts are executed in the context of telephone calls terminated on at least one instance of the Voice Media Switch 114 (which can be deployed internally or externally in a service provider network) as illustrated in FIG. 1. In order to terminate telephone calls on the Voice Media Switch 114, telephone numbers, as well as SIP addresses, may be provisioned through the telephone number and SIP Trunk service provider 112.

The provisioning may be implemented using the IVR backend 104 middleware software with REST API 107 interfacing with the service provider API module 109. The provisioned telephone numbers and SIP addresses are stored in the database 117, which is accessible by the IVR builder web application described above. Once the IVR script is linked to one or more telephone numbers and SIP addresses provisioned as described above, any telephone call placed to one of those phone numbers and SIP addresses are answered by the voice media switch 114, which then sends the incoming call event via the websocket 106 to the IVR backend 104. The event is handled by the backend middleware 104 and triggers execution of the compiled code of the IVR script linked to the phone number or the SIP address, which received the call. According to some embodiments of the current invention, various events are sent between the backend middleware 104 and the voice media switch 114 during the IVR script execution, triggering actions consistent with the corresponding smart IVR blocks' intended behavior. These actions include, but are not limited to, 1) a smart IVR "play prompt" illustrated at block 410, shown in FIG. 4, which may initiate an audio prompt action in the preset default language or, if enabled, in another language selected by the caller during the IVR script execution. In some instances, the audio prompt may be linked to the language specific binary audio file stored in cloud store 118, via its URL inserted into the proper prompt block-related code component of the compiled IVR script. This action may be implemented by the backend middleware 104 sending the "Play Prompt" event to the voice media switch 114 via WebSocket 106. The "Play Prompt" event may include a payload containing the prompt audio file URL and other relevant parameters. The voice media switch 114 API module receives the "Play Prompt" event, unpacks its payload, and passes the audio file URL and other parameters to the prompt-playing software module of the switch 114, which would in turn play the audio file into the connected phone call associated with the running IVR script. Other actions include a smart IVR "menu" block 311, an "extensions" block 312, an "option" block 313, and a "get digits" block 314 shown in FIG. 3, which may handle a collection of DTMF input (when the caller presses keys on the telephone keypad) or caller natural speech input or register no caller input status within some preset timeout. The key presses, uttered speech or timeouts trigger corresponding events in the voice media switch 114, which then propagates these events to the backend 104 via the WebSocket 106 or other suitable protocol. The DTMF or caller speech input or timeout events are handled by the backend middleware 104 and are routed into and processed by the proper smart block code components of the compiled IVR script.

Figure 3:
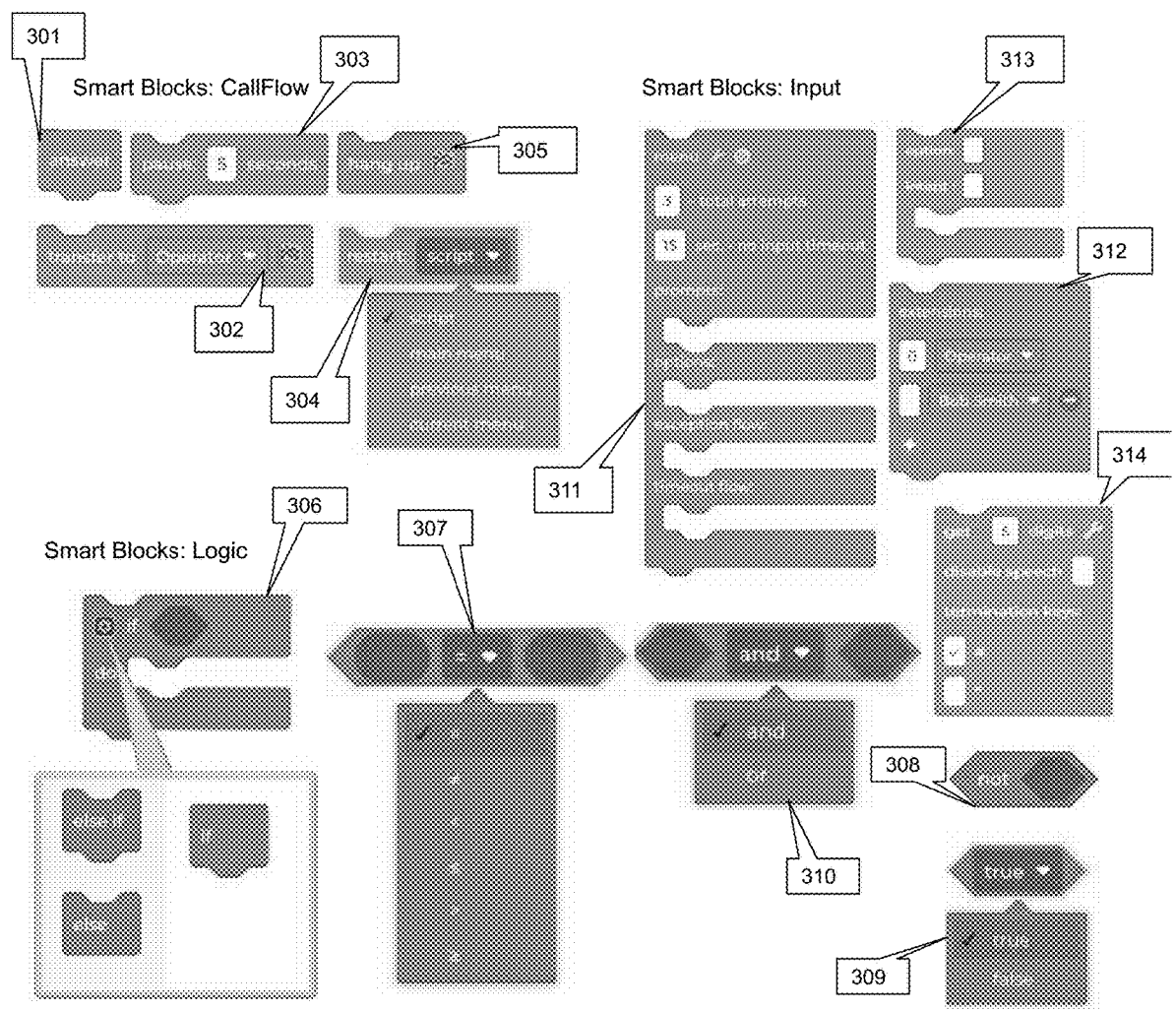
FIG. 3 is a block diagram illustrating some examples of interlocking "smart" IVR blocks that may be implemented or executed according to at least one embodiment of the present invention.
Figure 4:
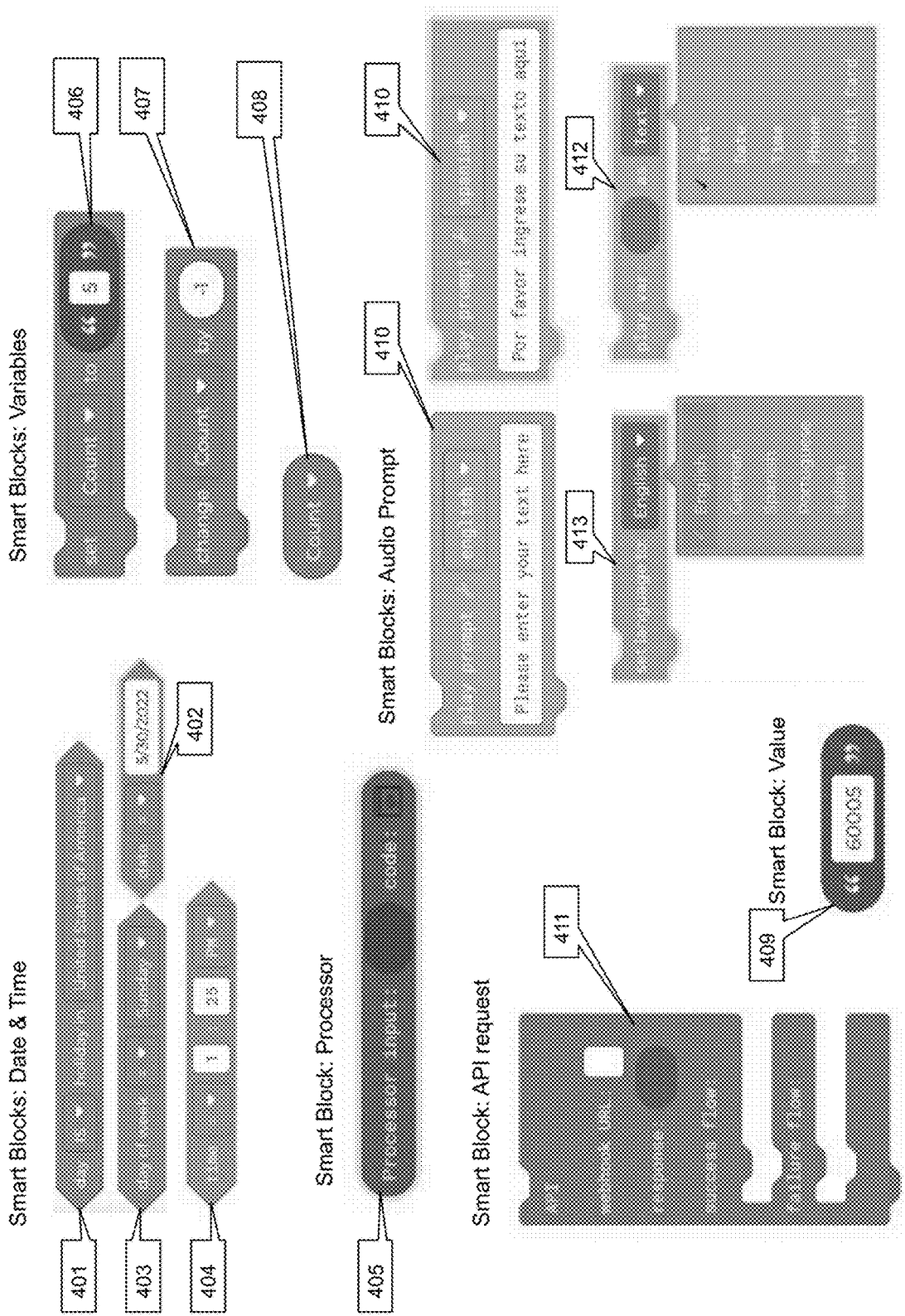
FIG. 4 is a block diagram and method flow illustrating some other examples of interlocking "smart" IVR blocks (e.g., on "Date and Time," "Variables," "API requests," and "Audio Prompts") that may be implemented according to at least one embodiment of the present invention.
Figure 5:
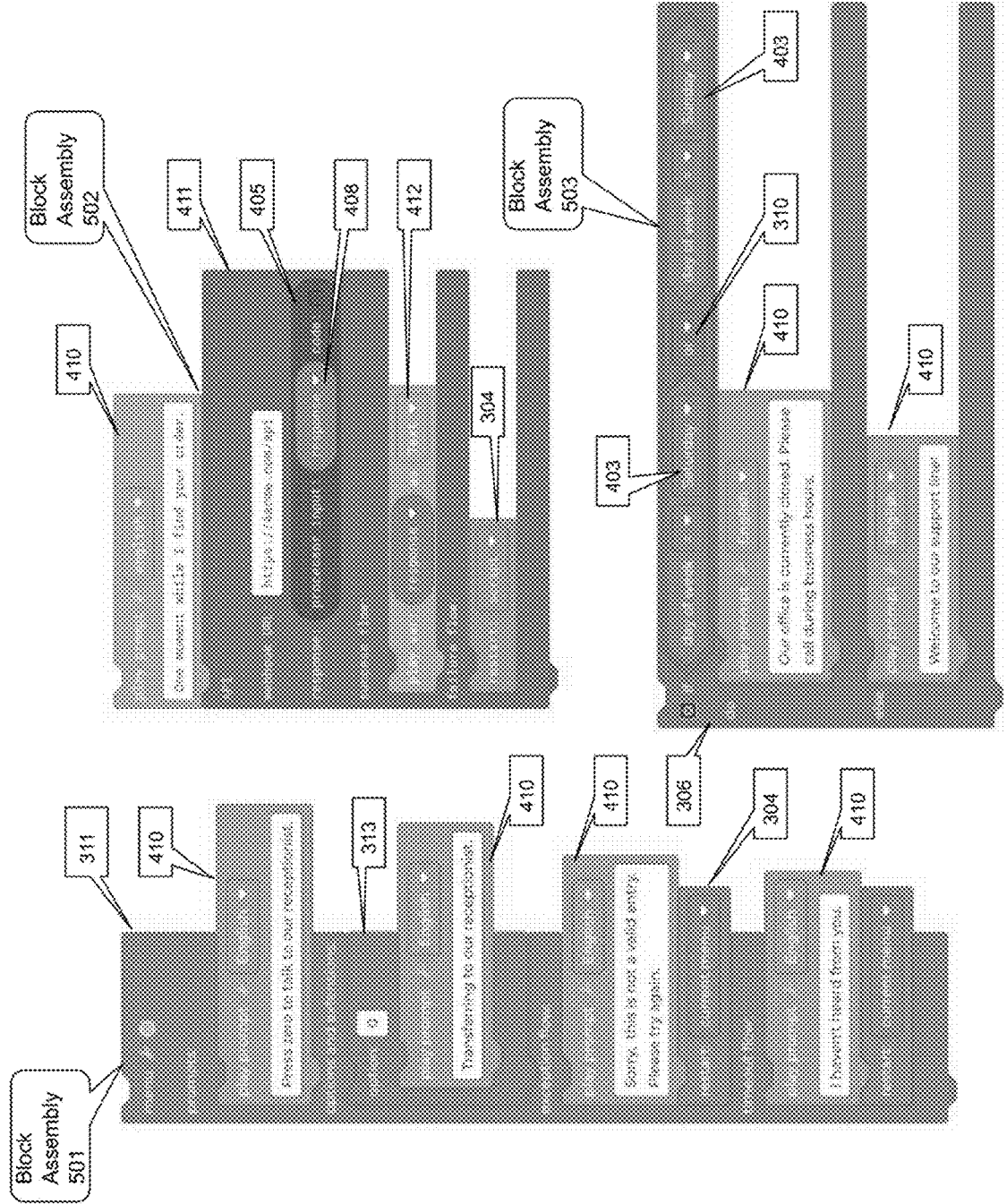
FIG. 5 is a block diagram and method flow illustrating some IVR examples that may be easily created using the interlocking smart IVR blocks illustrated in FIGS. 3 and 4 according to one embodiments of the present invention.

Other actions include a smart IVR "menu" block 311, the logic blocks 306-310, the variables blocks' 406-408, and the value block 409, shown in FIG. 3 and FIG. 4, which may process and validate the caller input. For example, if the caller entered a digit which is not one of the available menu options, an error is generated by the IVR script and may be announced to the caller, if the smart IVR "play prompt" block 410 with the error message is inserted into the exception flow slot of the smart IVR "menu" block 311. FIG. 5 illustrates the blocks 310 and 410 interlocked in the block assembly 501 that may implement this flow as part of the IVR script.

Other actions include, a smart IVR "transfer to" block 302, which may initiate exit from the IVR script, and then transfer the call to the caller's requested destination. In this case, the block 302 generates the call transfer event with the destination data in the event payload. The event is then propagated from the backend 104 to the voice media switch 114 via the WebSocket 106. Once the voice media switch 114 receives the call transfer event, it will unpack the event payload and then initiate the call transfer to the requested destination (phone number or VoIP endpoint).

Other actions include a smart IVR "API" block 411, shown in FIG. 4, which may initiate a web request to an external API endpoint, process the response using the smart IVR processor block 405, and capture the result in a smart IVR "variable" block 408.

FIG. 5 illustrates the blocks 411, 405, and 408 interlocked in the block assembly 502 that may implement this flow as part of the IVR script. Proceeding to describe smart IVR blocks of some embodiments of the current invention in more detail. FIG. 3, and FIG. 4 illustrate interlocking smart IVR blocks that may be implemented according to some embodiments of the present invention. Since some of the smart IVR blocks handle related IVR functions, they are organized into the corresponding groups, including, but not limited to: "Call Flow," "Input," "Logic," "Date & Time" and "Variables."

In some embodiments of the current invention, the IVR call flow group of smart blocks shown in FIG. 3 is used to implement various IVR script transitions as well as the phone call related actions. The call flow group includes a number of blocks. The IVR "answer" smart block 301 is used as the first block of any IVR script. According to some embodiments of the present invention, IVR scripts may be linked to one or more phone numbers provisioned by the phone number and SIP trunk service provider 112 to terminate calls to the voice media switch 114 as shown in FIG. 1. IVR "answer" block 301 is required for the voice media switch 114 to answer an incoming call.

The IVR "transfer to" smart block 302 may be used to transfer IVR calls to employees or other company destinations. According to at least one embodiment of the present invention, IVR block 302 may have a selector presenting, for example, a list of employee or department names or other destinations, such as "Operator," where the IVR call could be transferred. The employee, department or other destination names may be linked to their actual phone numbers or VoIP endpoints, such as SIP URLs or WebRTC enabled web or mobile applications, provisioned in the corresponding accounts stored in the database.

In some embodiments, the IVR "pause" block 303 may be used to pause IVR script execution for a preset number of seconds to let the caller find some information, such as account number. The pause block 303 is sensitive to caller input. The caller can exit from the pause block and continue IVR script execution by pressing any key on the telephone keypad before the block timeout expires.

In some embodiments, the IVR "restart" smart block 304 may be used to implement various types of transitions during IVR execution. According to at least one embodiment of the present invention, IVR "restart" smart block 304 may have a selector of IVR transitions including, but not limited to: a restart script, to transition to and restart IVR execution from the starting point of the IVR script. It may have a Restart main menu, to transition to the upstream, previously executed IVR smart "menu" block 311 that is configured as a main menu. There can be more than one main menu in IVR script that has separate trees branching from the common root. It may have a Restart previous menu, to transition to the previously executed menu as illustrated by the IVR smart "menu" block 311. In this case, the meaning of "previous" refers to the target menu immediately upstream from the current menu in the IVR tree, not to the previously executed menu if different from the above-mentioned target menu.

It may have a restart the current menu, to transition to the starting point of the current menu. This is often used to allow the caller to replay the menu prompt to hear available options again. It may have the IVR "hang up" smart block 305, used to terminate the IVR script and disconnect the call.

In some embodiments of the current invention, the IVR Logic group shown in FIG. 3 includes smart blocks that may be used to implement desired logical flows of the IVR script.

For example, as shown in FIG. 5, the block assembly 503 of the smart IVR logic blocks "if" 306, "and/or" 310, "day-of-week" block 403, and "play prompt" blocks 410 may be used to play a different audio prompt on weekends vs on weekdays. The Logic group blocks include a smart IVR block 306 implementing conditional operators "if", "else", "else-if". This block has slots in the 'if' and 'else-if' sections where other logical blocks 307-310, date-and-time smart blocks 401-404, or the "variable" smart block 408 can be inserted to build desired logical flows in the IVR script. In some embodiments, smart IVR block 307 implementing comparison operators (equal =, not equal ≠, less than <, greater than >, less than or equal ≤, greater than or equal ≥) may be used. In some embodiments, smart IVR blocks 308, 310 implementing boolean operators ("and", "or", "not") may be used. In yet other embodiments, smart IVR block 309 implementing boolean variables ("true", "false") may be used.

In some embodiments of the current invention the IVR Input group shown in FIG. 3 includes smart blocks 311-314 that may be used to process the caller touch-tone (DTMF) or natural speech input. These smart blocks may significantly reduce the complexity of IVR construction by automating the core IVR functionality, such as confirmation dialogs and speech discourse dialogs when speech uttered is not recognized with high confidence.

The Input group blocks include a smart IVR "menu" block 311 implementing the core component of IVR functionality comprising playing a prompt, collecting caller input and then making a transition based on that input or based on no input within a preset time period. There are configuration settings within the smart "menu" block 311. They include, but are not limited to: total number of attempts to get valid input from the caller, number of seconds to wait for the caller input, etc. The smart "menu" block 311 may be interlocked with other smart blocks using the following 4 slots: prompts, options, exception flow and timeout flow. It should be recognized that the prompts slot is used to insert one or more smart IVR "play prompt" blocks 410 into it. When the IVR script transitions to a "menu" block 311, the audio content of "play prompt" blocks 410 contained in the prompts slot of the "menu" block 311 are played to the caller. At that point, the caller may hear the options available at the menu. For example, the caller may be asked to press some numeric keys to transfer to various company departments or enter an extension to transfer to an employee The options slot of the "menu" block 311 may be used to insert one or more "option" smart blocks 313, and "extensions" smart block 312. These blocks handle caller DTMF or caller speech input; they are described below. The exception flow slot of the "menu" block 311 may be used to handle any "erroneous" caller input that is not expected by the IVR. For example, if the caller enters "8," while the IVR builder expects digits in the 1-5 range, the smart "menu" block 311 transitions control to its exception flow. The exception flow slot may contain the "play prompt" smart block 410 with audio content such as: "This is not a valid entry, please try again" played to the caller to indicate an invalid entry. The smart IVR "option" block 313 is designed to be inserted into the "menu" block 311 to capture specific DTMF input or natural speech input by the caller, and then make the corresponding transition in the IVR flow. Each "option" block 313 has text fields where the expected caller keypad input or the corresponding caller's intent (determined from caller spoken input by the option block's underlying AI model) may be configured.

Figure 6:
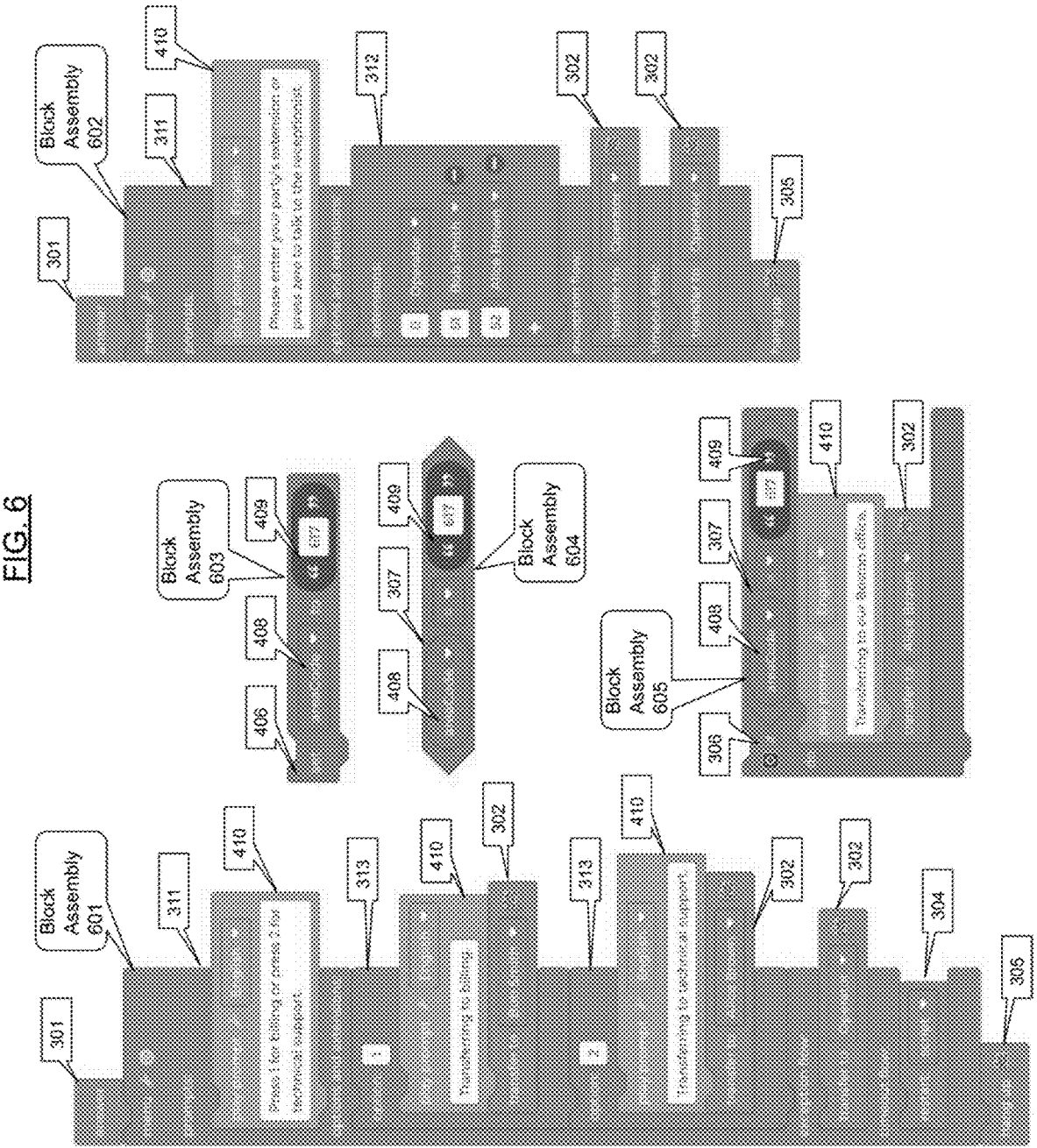
FIG. 6 is yet another block diagram and method flow illustrating some other IVR examples.

For example, the block assembly 601 shown in FIG. 6 illustrates a smart IVR "menu" block 311 containing the "play prompt" block 410 in its prompts slot with the audio prompt advising the caller to press one for billing or press two for technical support. To capture the caller input in this case, two smart "option" blocks 313 are inserted into the "menu" block 311 options and extensions slot. The first of the two "option" blocks having "1", and the second having "2" in the text field. If the caller enters "2", the "menu" block automatically handles IVR flow transition to the second "option" block which then executes smart blocks 410 and 302 inserted into it to transfer the call to technical support.

The smart IVR "extensions" block 312 is designed to be inserted into the "menu" block 311 in order to handle extension entries or extension owners' names by callers via touch-tones or natural speech attempting to reach company employees or other destinations, such as front desk. The block 312 may be linked via an API or other data access method to the company directory including the list of employee names and their extensions. Alternatively, the list of employee names and their extensions can be manually configured in the smart block 312. An example of the smart block 312 use is shown in FIG. 6, block assembly 602.

In some embodiments of the current invention, the smart IVR block "value" 409 as shown in FIG. 4 may be used to assign a value to the smart IVR block "variable" 408. As illustrated in FIG. 4, the value assignment may be accomplished by inserting the smart blocks 408 and 409 into the smart IVR block "set" 406. In some embodiments, the smart "value" block 409 may be used to evaluate smart IVR "variable" block 408 by inserting the blocks 408 and 409 into the smart IVR block 307 comprising comparison operators. Some examples of the smart block 409 use are shown in FIG. 6, block assemblies 603 and 604.

In some embodiments of the current invention, the IVR Audio Prompt smart block group shown in FIG. 4 includes smart blocks 410, 412, and 413, which may be used to play audio prompts to the caller in a selected language. As illustrated in FIG. 4, the smart IVR "play prompt" block 410 has a language selector which allows for configuring multilingual prompts in a single block 410. Each language selector of the block 410 opens up or commences a separate text area where the prompt text can be entered in the selected language. The block 410 also may have additional configuration options, such as enable/disable DTMF or speech cutting through the prompt.

The smart IVR "set-language-to" block 413 may be used to allow the IVR callers to select their preferred audio prompts language in the beginning of the IVR script execution. The smart IVR "play var" block 412 may be used to play any dynamic content of the variable smart block 408 when it is inserted into the block 412 slot. The content of the smart block 408 may be played to the IVR caller, as text, date, time, phone number, credit card number, currency, and any other desired format using the smart block 412 format selector. Concatenation of smart blocks 410 with static audio prompt content, and smart blocks 412 with dynamic audio prompt content allows for flexibility in building dynamic IVR applications with user friendly voice interface.

In some embodiments of the current invention, the IVR Variables block group shown in FIG. 4 include smart blocks 406, 407, and 408. All variables required for the IVR business logic are created during the IVR script construction using the smart IVR "variable" block 408, at which point variable names are assigned. As illustrated in FIG. 4, the "variable" block 408 may be set to a value using smart block "set" 406 interlocked with the smart "value" block 409.

FIG. 4 also illustrates that the value in the "variable" block 408 may be incremented/decremented by inserting it into the smart block "change" 407 or, as shown in FIG. 6, block assemblies 604 and 605, the value in the block 408 may be evaluated by inserting the smart "variable" block 408 into smart logic blocks 306 or 307.

In some embodiments of the current invention, the IVR Date & Time block group shown in FIG. 4 includes smart blocks 401-404, which may be used to implement various date and time-dependent functions. As shown in FIG. 5, the block assembly 503 and the smart IVR "day-of-week" block 403 may be used with the smart IVR "if" block 306, to check the current day of the week. Similarly, the smart IVR blocks 401, 402 and 404 may be used to check holiday days in a given country, check the current date and check the current time, respectively.

Figure 7:
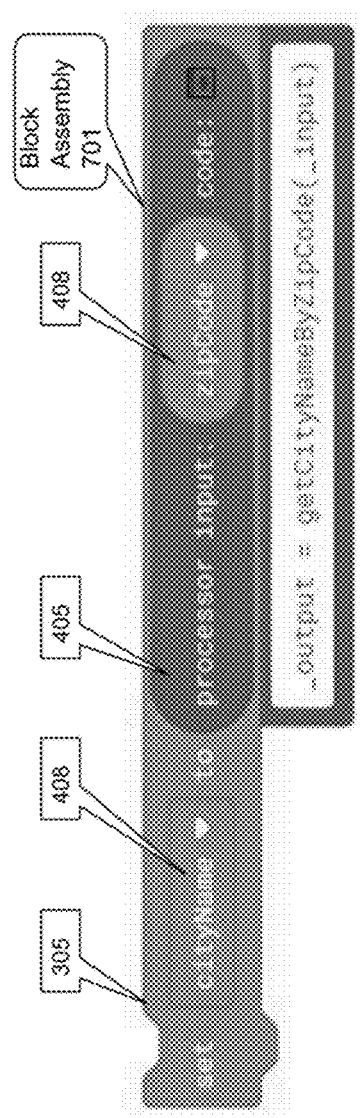
FIG. 7 is a block diagram illustrating the use of some smart blocks.

In some embodiments of the current invention, the smart IVR block "processor" 405 shown in FIG. 4 may be used to pre-process any content before it can be assigned to the smart IVR "variable" block 408. This is enabled by allowing the "processor" block 405 to be inserted into any smart block that may accept the "variable" block 408. In that case, the "variable" block 408 in turn is inserted into the "processor" block 405. Therefore, block 405 is a container block that accepts block 408 into its "input" slot. According to some embodiments of the current invention, the "code" element of the "processor" block 405 allows entry of source code, such as JavaScript. The source code works similar to the Unix pipe and can pre-process content as required before assigning the result to the "variable" block 408 inserted into the "input" slot of the block 405. An example of the smart IVR blocks 405, 408 use is illustrated in FIG. 7, block assembly 701. The assembly 701 shows "processor" block 405 JavaScript source code example which implements getCityNameByZipCode function that takes zip code as a parameter via the JavaScript reserved variable "_input" and returns the corresponding cityName via the JavaScript reserved variable "_output". The reserved variables are linked to the corresponding smart IVR "variable" blocks 408 zipCode and cityName. All the JavaScript libraries required by the "processor" blocks 405 may be defined within the global scope for each IVR script.

In some embodiments of the current invention, the smart IVR block "API" 411 shown in FIG. 4 may be used to access external systems REST API web services to provide real-time data to the IVR users. This real-time data access capability of the current invention enables construction of powerful dynamic IVR applications. For example, using the block 411, an IVR application may be implemented to provide a real-time order status to the IVR user. Order status could be maintained in the enterprise database and exposed to external IVR systems via the webhook access method. The block 411 has the following properties, including 1) webhook URL, which is a text field where the external web site webhook URL may be entered. During IVR run-time, based on the IVR user action, the "API" block 411 initiates a web request using the webhook URL and capture the web response. The block 411 also has a 2) response, which is a slot where the smart IVR "variable" block 408 may be inserted in order to capture the web response returned after the web request is sent using the webhook URL. As shown in FIG. 5, block assembly 502, the smart IVR "processor" block 405 may also be inserted into the response slot of the block 411 to pre-process the web response before assigning the result to the "variable" smart block 408 inserted in the input slot of the "processor" smart block 405. The block 411 may also describe the success flow, by a slot that may contain one or more smart IVR "play prompt" and "play var" blocks 410 and 412 including the relevant web response content played to the IVR caller after successful processing of the web request sent using the webhook URL. The success flow slot may also contain other smart IVR blocks to implement required transitions in the IVR script. FIG. 5, block assembly 502, illustrates the block 411 success flow use. Yet another property is 4) the failure flow, which is a slot that may contain one or more smart IVR "play prompt" and "play var" blocks 410 and 412 including the relevant web response content played to the IVR caller after failure status was returned from the web request sent using the webhook URL. The failure flow slot may also contain other smart IVR blocks, such as the smart IVR "restart" block 304, to implement required transitions in the IVR script. FIG. 5, block assembly 502, illustrates the block 411 failure flow use.

Some example source code is included below.

| Smart Block Components Source Code (by way of example) |
| --- |

```
/******************/
/* answer block */
/******************/
'use strict'
module.exports = {
  type: 'flow_answer',
  message0: 'answer',
  nextStatement: ['flow', 'flow_answer'],
  colour: '#76B947',
  tooltip: 'Answer incoming call',
  category: 'Call Flow'
}
/******************/
/* date block */
/******************/
'use strict'
module.exports = {
  type: 'flow_date',
  message0: 'date %1 %2',
  args0: [{
    type: 'field_dropdown',
    name: 'OPERATOR',
    options: [
      [
        '=',
        '==='
      ],
      [
        '≠',
        '!=='
      ],
      [
        '>',
        '>'
      ],
      [
        '<',
        '<'
      ]
    ]
  },
  {
    type: 'field_date',
    name: 'VAR',
    token: 'L/d/yyyy'
  }
  ],
  colour: '#43B0F1',
  output: 'Boolean',
  tooltip: 'Compare to the current date',
  category: 'Time & Date'
}
/************************/
/* day of week block */
/************************/
'use strict'
module.exports = {
  type: 'flow_day',
  message: 'day of week %1 %2',
  args0: [{
    type: 'field_dropdown',
    name: 'OPERATOR',
    options: [
      [
        '=',
        'true'
      ],
```

| Smart Block Components Source Code (by way of example) |
|---|

```
            [
              '≠',
              'false'
            ]
          ]
        }
      },
      {
        type: 'field_dropdown',
        name: 'VAR',
        options: [
          ['Sunday', '7'],
          ['Monday', '1'],
          ['Tuesday', '2'],
          ['Wednesday', '3'],
          ['Thursday', '4'],
          ['Friday', '5'],
          ['Saturday', '6']
        ]
      }
    ],
    inputsInline: true,
    output: 'Boolean',
    colour: '#43B0F1',
    tooltip: 'Day of week',
    category: 'Time & Date'
}
/************************/
/*   transfer block   */
/************************/
'use strict'
const config = require('../../../config')
const component = async function (account = { }) {
  const options = (await account.getCompanyAccounts())
    .filter((i) => i.number)
    .map((i) => ([`${i.first_name} ${i.last_name}`.trim( ), i.uid])
  const flow_forward = {
    type: 'flow_forward',
    message0: 'transfer to %1 %2',
    args0: [{
      type: 'field_dropdown',
      name: 'account',
      options,
    },
    {
      type: 'field_image',
      src: `${config.app.url}/static/finish.png`,
      width: 20,
      height: 20,
      alt: 'Finish'
    }]
    previousStatement: ['flow', 'flow_forward'],
    colour: '#76B947',
    tooltip: 'Blind call transfer to a phone number or SIP URL',
    category: 'Call Flow'
  }
  return flow_forward
}
module.exports = component
/************************/
/*   hang up block   */
/************************/
'use strict'
const config = require('../../../config')
module.exports = {
  type: 'flow_hangup',
  message0: 'hang up %1',
  args0: [{
    type: 'field_image',
    src: `${config.app.url}/static/finish.png`,
    width: 20,
    height: 20,
    alt: 'Finish'
  }],
  previousStatement: ['flow', 'flow_forward'],
  colour: '#76B947',
  tooltip: 'Hang up call',
  category: 'Call Flow'
```

| Smart Block Components Source Code (by way of example) |
| --- |

```
}
/************************/
/*   holiday up block   */
/************************/
/* eslint-disable indent */
'use strict'
const DateHolidays = require('date-holidays')
const Timezones = require('countries-and-timezones')
module.exports = async function (account = { }) {
  let { timeZone } = account.profile
  if (!timeZone) {
    timeZone = 'America/New_York'
  }
  const country = (Timezones.getCountryForTimezone(timeZone) || { }).id || 'US'
  const dt = new DateHolidays(country)
  const countries = dt.getCountries('en')
  const options = Object.keys(countries)
    .map(i => [countries[i], i])
    .sort( )
    .sort((a) => (a[1] === country ? -1 : 0))
  return {
    type: 'flow_holiday',
    message0: 'day %1 holiday in %2',
    args0: [{
      type: 'field_dropdown',
      name: 'OPERATOR',
      options: [
        [
          'IS',
          '==='
        ],
        [
          'IS NOT',
          '!=='
        ]
      ]
    },
    {
      type: 'field_dropdown',
      name: 'COUNTRY',
      options: [...options]
    }
    ],
    inputsInline: true,
    output: 'Boolean',
    colour: '#43B0F1',
    tooltip: 'Check if the day is a holiday',
    category: 'Time & Date'
  }
}
/************************/
/*   menu block   */
/************************/
/* eslint-disable */
'use strict'
const config = require('../../../config')
const serialize = require('serialize-javascript')
const obj = {
  type: 'flow_ivr',
  show_options: false,
  label: 'menu',
  tollitp: 'Main menu',
  input_timeout: 15,
  max_input_timeout: 120,
  attempts: 3,
  max_attempts: 1000,
  tag: false,
  colour: '#47B97E',
  tag_colour: '#499970',
  tag_label: 'main menu',
  check: ['flow', 'flow_ivr'],
  baseurl: config.app.url,
  init: function ( ) {
    this.appendDummyInput('main')
      .appendField(this.label)
      .appendField(new Blockly.FieldImage(
        `${this.baseurl}/static/gear.png`,
```

| Smart Block Components Source Code (by way of example) |
|---|

```
            15,
            15,
            '*',
            this.toggleOptions.bind(this)))
          .appendField(new Blockly.FieldImage(
            '${this.baseurl}/static/power.png',
            15,
            15,
            '*',
            this.toggleTag.bind(this)))
          .appendField('', 'tag_label')
        this.appendDummyInput('prompts_input')
          .appendField('prompts:')
        this.appendStatementInput('prompts_statement')
          .setCheck('flow_speak')
        this.appendDummyInput('options_input')
          .appendField('options and extensions:')
        this.appendStatementInput('options_statement')
          .setCheck(['flow_ivr_option', 'flow_ivr_extension'])
        this.appendDummyInput('exception_input')
          .appendField('exception flow:')
        this.appendStatementInput('exception_statement')
          .setCheck(this.check)
        this.appendDummyInput('timeout_input')
          .appendField('timeout flow:')
        this.appendStatementInput('timeout_statement')
          .setCheck(this.check)
        this.setPreviousStatement(true, this.check)
        this.setNextStatement(true, this.check)
        this.setColour(this.colour)
      },
      mutationToDom( ) {
        const container = document.createElement('mutation')
        container.setAttribute('show_options', this.show_options === true)
        container.setAttribute('tag', this.tag === true)
        container.setAttribute('input_timeout', this.input_timeout)
        container.setAttribute('attempts', this.attempts)
        return container
      },
      domToMutation(xmlElement) {
        this.show_options = (xmlElement.getAttribute('show_options') | '')
          .toString( ).toUpperCase( ) === 'TRUE'
        this.tag = (xmlElement.getAttribute('tag') || '')
          .toString( ).toUpperCase( ) === 'TRUE'
        this.inactive_timeout = xmlElement.getAttribute('input_timeout')
        this.attempts = xmlElement.getAttribute('attempts')
        this.reshape( )
      },
      reshape: function ( ) {
        if (this.show_options) {
        this.appendDummyInput('attempts_input')
          .appendField(new Blockly.FieldNumber(
            this.attempts,
            1,
            this.max_attempts,
            null,
            (val) => this.attempts = val),
            'attempts'
          )
          .appendField('attempts to get input')
        this.appendDummyInput('input_timeout_input')
          .appendField(new Blockly.FieldNumber(
            this.input_timeout,
            1,
            this.max_input_timeout,
            null,
            (val) => this.input_timeout = val),
            'input_timeout'
          )
          .appendField('sec. no input timeout')
        this.moveInputBefore('attempts_input', 'prompts_input')
        this.moveInputBefore('input_timeout_input', 'prompts_input')
      } else {
        this.removeInput('attempts_input', true)
        this.removeInput('input_timeout_input', true)
      }
      this.renderTag( )
```

| Smart Block Components Source Code (by way of example) |
|---|

```
  },
  renderTag: function( ) {
    this.setColour(this.tag ? this.tag_colour : this.colour)
    this.getField('tag_label').setValue(this.tag ? this.tag_label : '')
  },
  toggleOptions: function( ) {
    this.show_options = !this.show_options
    this.reshape( )
  },
  toggleTag: function( ) {
    const tag = !this.tag
    let block = this
    if (tag) {
      while (block) {
        const child = block
        block = block.getSurroundParent( )
        if (block && block.type === 'flow_ivr') {
          const nested = this.getNestedBlocks(block).filter(i => i.id !== child.id)
          if (this.hasRestart(nested)) {
            return
          }
        }
      }
      this.clearTagOthers( )
    } else {
      if (this.hasRestart(this.getNestedBlocks(block))) {
        return
      }
    }
    this.tag = tag
    this.renderTag( )
  },
  clearTag: function( ) {
    this.tag = false
    this.renderTag( )
  },
  clearTagOthers: function( ) {
    const tree = this.getMenuTree( )
    tree.filter(i => i.tag && i.id !== this.id).forEach(i => i.clearTag( ))
  },
  hasRestart: function(blocks = [ ]) {
    if (!blocks || !blocks.length) {
      return
    }
    for (const i of blocks) {
      if (
        i.type === 'flow_restart' &&
        i.getFieldValue('kind') === 'MAIN_MENU'
      ) {
        return i
      }
    }
    return this.hasRestart(blocks.map(i => i.getChildren( )).flat( ).filter(i => i))
  },
  getNestedBlocks: function(block) {
    const next = block.getNextBlock( ) || { }
    return block.getChildren( ).filter(i => i.id !== next.id)
  }
  getRootMenu: function( ) {
    let block = this
    let root = this
    while (block) {
      block = block.getSurroundParent( )
      if (block && block.type === 'flow_ivr') {
        root = block
      }
    }
    return root
  },
  getMenuTree: function( ) {
    const root = this.getRootMenu( )
    return this.workspace.getAllBlocks( )
      .filter(i => i.type === 'flow_ivr' && i.getRootMenu( ).id === root.id)
  }
}
module.exports = {
  type: 'flow_ivr',
```

| Smart Block Components Source Code (by way of example) |
|---|

```
message0: 'Menu %1 %2 %3 %4 %5 %6 %7',
args0: [
   {
      type: 'field_input',
      name: 'prompt',
      text: 'Please enter your text here'
   },
   {
      type: 'field_number',
      name: 'input_timeout',
      value: 15,
      min: 1,
      max: 120
   },
   {
      type: 'field_number',
      name: 'attempts',
      value: 3,
      min: 1,
      max: 1000
   },
   {
      type: 'input_statement',
      name: 'prompts_statement',
      check: 'flow_speak'
   },
   {
      type: 'input_statement',
      name: 'options_statement',
      check: ['flow_ivr_option', 'flow_ivr_extension']
   },
   {
      type: 'input_statement',
      name: 'exception_statement',
      check: obj.check
   },
   {
      type: 'input_statement',
      name: 'timeout_statement',
      check: obj.check
   }
]
inputsInline: false,
previousStatement: obj.check,
nextStatement: obj.check,
serialized: serialize(obj),
mutator: 'flow_ivr_mutator',
colour: '#47b97e',
tooltip: 'Menu',
category: 'Keypad Input'
}
/************************/
/*     option block     */
/************************/
const CHECK = [
   'flow_ivr_option',
   'flow_ivr_extension'
]
module.exports = {
   type: 'flow_ivr_option',
   message0: 'option: %1 %2 %3',
   args0: [
      {
         type: 'field_input',
         name: 'option',
         text: ''
      },
      {
         type: 'input_dummy'
      },
      {
         type: 'input_statement',
         name: 'options',
         check: 'flow'
      }
   ],
   previousStatement: CHECK,
```

| Smart Block Components Source Code (by way of example) |
|---|

```
    nextStatement: CHECK,
    colour: '#47b97e',
    tooltip: 'Menu options',
    category: 'Keypad Input'
}
/*************************/
/*   extensions block   */
/*************************/
/* eslint-disable */
'use strict'
const config = require('../../../config')
const db = require('../../../db')
const serialize = require('serialize-javascript')
const component = async function (account = { }) {
    const accounts = [ ]
    const { rows } = await db.query('
        SELECT
            a.uid,
            a.profile->>'firstName' as first_name,
            a.profile->>'lastName' as last_name
        FROM
            accounts a
        WHERE
            a.company_id = $1 AND a.profile ->> 'number' IS NOT NULL
    ', [account.company_id])
    for (const row of rows || [ ]) {
        const { uid, first_name, last_name } = row
        const cap = '${ first_name || ''} ${last_name || ''}'.trim( )
        cap && accounts.push([cap, uid])
    }
    const obj = {
        colour: '#47b97e',
        label: 'extensions:',
        tolltip: 'Extensions',
        accounts,
        defaultRow: { id: '', ext: '', account: '' },
        rows: [ ],
        check: ['flow_ivr_option', 'flow_ivr_extension'],
        baseurl: config.app.url,
        init: function ( ) {
            this.setOnChange(function(changeEvent) {
                if (changeEvent.element === 'field') {
                    const buf = changeEvent.name.split('_')
                    const item = this.rows.find((i) => i.id === buf[1])
                    if (item) item[buf[0]] = changeEvent.newValue
                }
            })
            this.appendDummyInput('main')
                .appendField(this.label)
            this.toggleControl( )
            this.setPreviousStatement(true, this.check)
            this.setNextStatement(true, this.check)
            this.setColour(this.colour)
        },
        mutationToDom( ) {
            const container = document.createElement('mutation')
            container.setAttribute('rows', JSON.stringify(this.rows))
            container.setAttribute('accounts', JSON.stringify(this.accounts))
            return container
        },
        domToMutation(xmlElement) {
            this.rows = JSON.parse(xmlElement.getAttribute('rows'))
            this.reshape( )
        }
        reshape: function ( ) {
            let i = 0
            if (!this.rows.length) {
                this.rows.push({ id: crypto.randomUUID( ), account: this.accounts[0][1]})
            }
            for (const row of this.rows) {
                if (!this.getInput(row.id)) {
                    const input = this.appendDummyInput(row.id)
                        .appendField(new Blockly.FieldTextInput(row.ext), 'ext_${row.id}')
                        .appendField(new Blockly.FieldDropdown(this.accounts),
'account_${row.id}')
                    i !== 0 && input.appendField(new Blockly.FieldImage(
                        '${ this.baseurl }/static/minus.png',
```

| Smart Block Components Source Code (by way of example) |
|---|

```
              20,
              20,
              '*',
              this.dropExtension.bind(this, this, row.id)))
            this.setFieldValue(row.account, 'account_${row.id}')
          }
          i++
        }
        this.toggleControl( )
      },
      validate: function(val) {
        const block = this.getSourceBlock( )
        block.input_text = val
      },
      toggleControl: function( ) {
        this.removeInput('control', true)
        this.appendDummyInput('control')
          .appendField(new Blockly.FieldImage(
            '{this.baseurl}/static/plus.png',
            20,
            20,
            '*',
            this.addExtension.bind(this)))
      },
      addExtension: function ( ) {
        this.rows.push({ id: crypto.randomUUID( ), account: this.accounts[0][1]})
        this.reshape( )
      },
      dropExtension: function (self, id) {
        this.rows = this.rows.filter((i) => i.id !== id)
        this.removeInput(id, true)
        this.reshape( )
      }
    }
    const flow_ivr_extension = {
      type: 'flow_ivr_extension',
      message0: 'extensions',
      inputsInline: true,
      previousStatement: obj.check,
      nextStatement: obj.check,
      serialized: serialize(obj),
      mutator: 'flow_ivr_extension_mutator',
      colour: obj.colour,
      tooltip: 'Extensions',
      category: 'Keypad Input'
    }
    return flow_ivr_extension
  }
module.exports = component
/************************/
/*   restart block   */
/************************/
/* eslint-disable */
'use strict'
const serialize = require('serialize-javascript')
const obj = {
  type: 'flow_restart',
  label: 'restart:',
  tollitp: 'Restart',
  category: 'Call Flow',
  colour: '#76B947',
  extended: true,
  check: ['flow', 'flow_restart'],
  options: [ ],
  map: null,
  RESTART: Object.freeze({
    SCRIPT: 'SCRIPT',
    MAIN_MENU: 'MAIN_MENU',
    PREVIOUS_MENU: 'PREVIOUS_MENU',
    CURRENT_MENU: 'CURRENT_MENU'
  }),
  _init: function( ) {
    this.map = new Map([
      ['script', this.RESTART.SCRIPT],
      ['main menu', this.RESTART.MAIN_MENU],
      ['previous menu', this.RESTART.PREVIOUS_MENU],
      ['current menu', this.RESTART.CURRENT_MENU]
```

| Smart Block Components Source Code (by way of example) |
| --- |

```
    ])
    return this
},
init: function( ) {
    this._init( )
    this.appendDummyInput('main').appendField(this.label)
    this.setPreviousStatement(true, this.check)
    this.setColour(this.colour)
    this.reshape( )
},
mutationToDom( ) {
    const container = document.createElement('mutation')
    container.setAttribute('extended', this.extended)
    return container
},
domToMutation(xmlElement) {
    this.extended = xmlElement.getAttribute('extended') === 'true'
    this.reshape( )
},
reshape: function(extended) {
    if (this.extended === extended) {
        return
    }
    if (extended !== undefined) {
        this.extended = extended
    }
    this.options = this.getOptions( )
    const input = this.getInput('main')
    input.removeField('kind', true)
    input.appendField(new Blockly.FieldDropdown(this.options), 'kind')
},
findParent: function(type) {
    let block = this
    while (block) {
        block = block.getSurroundParent( )
        if (block && block.type === type) {
            return block
        }
    }
},
getOptions: function( ) {
    const entries = [...this.map.entries( )]
    return this.extended ?
        entries : entries.filter(i => [this.RESTART.SCRIPT].includes(i[1]))
},
validate Tree: function( ) {
    if (this.getFieldValue('kind') !== this.RESTART.MAIN_MENU) {
        return
    }
    let parent, tag, block = this
    while (block) {
        block = block.getSurroundParent( )
        if (block && block.type === 'flow_ivr') {
            if (!parent) parent = block
            if (block.tag) tag = block
        }
    }
    if (!tag && parent) {
        parent.clearTagOthers( )
        parent.tag = true
        parent.renderTag( )
    }
}
}
module.exports = {
    type: obj.type,
    message0:'${obj.label}: %1',
    args0: [{
        type: 'field_dropdown',
        name: 'kind',
        options: obj._init( ).getOptions( )
    }],
    previousStatement: obj.check,
    serialized: serialize(obj),
    colour: obj.colour,
    tooltip: obj.tollitp,
    category: obj.category
```

| Smart Block Components Source Code (by way of example) |
|---|

```
}
/*************************/
/* set language block */
/*************************/
const languages = require('../../utils/vars/languages')
module.exports = async ( ) => ({
  type: 'flow_language',
  message0: 'set language to: %1',
  args0: [{
    type: 'field_dropdown',
    name: 'lang',
    options: [...languages.entries( )].map(i => [i[1]?.Name, i[0]])
  }],
  previousStatement: null,
  nextStatement: null,
  check: ['flow', 'flow_language'],
  category: 'Audio Prompt',
  colour: '#AFBF43',
  tooltip: 'Set language'
}]
/*************************/
/* play prompt block */
/*************************/
/* eslint-disable */
'use strict'
const config = require('../../../config')
const { languages } = require('../../../lib/utils')
const serialize = require('serialize-javascript')
const obj = {
    type: 'flow_speak',
    label: 'play prompt',
    tollitp: 'Speak input text',
    colour: '#AFBF43',
    baseurl: config.app.url,
    check: [
        'flow',
        'flow_speak',
    ],
    langs: languages( ),
    _data: {
    show_options: false,
    lang: 'EN',
    options: [
        {
          name: 'dial_ahead',
          type: 'Boolean',
          label: 'dial ahead',
          value: true,
        },
        {
          name: 'flush_dtmf',
          type: 'Boolean',
          label: 'flush DTMF',
          value: true,
        },
    ],
    text: {
      'EN': 'Please enter your text here'
    }
},
init: function ( ) {
  this.appendDummyInput('controls')
    .appendField(this.label)
    .appendField(new Blockly.FieldImage(
       `${this.baseurl}/static/gear.png`,
       15,
       15,
       '*',
       this.toggleOptions.bind(this)))
    .appendField(new Blockly.FieldDropdown(this.langs, this.updateLang), 'lang')
  this.appendDummyInput('main')
    .appendField(new Blockly.FieldTextBox(this.getInputText( ), this.updateText, {
        closeOnEnter: false
    }), 'input_text')
  this.setPreviousStatement(true, this.check)
  this.setNextStatement(true, this.check)
  this.setColour(this.colour)
```

| Smart Block Components Source Code (by way of example) |
| --- |

```
},
mutationToDom( ) {
   const container = document.createElement('mutation')
   container.setAttribute('data', JSON.stringify(this._data))
   return container
},
domToMutation(xmlElement) {
   this._data = JSON.parse(xmlElement.getAttribute('data'))
   this.reshape( )
},
reshape: function ( ) {
   if (this ._ data.show_options) {
      for (const i of this._data.options) {
         if (!this.getInput(i.name)) {
            let field
            if (i.type === 'Boolean') {
               field = new Blockly.FieldCheckbox(i.value, (value) => {
                  const item = this._data.options.find(opt => opt.name === i.name)
                  if (item) item.value = value === 'TRUE'
               })
            }
            this.appendDummyInput(i.name)
               .appendField(field, i.name)
               .appendField(i.label)
         }
      }
   } else {
      this._data.options.forEach(i => this.removeInput(i.name, true))
   }
   const input = this.getInput('main')
   input && input.getSourceBlock( ).setFieldValue(this.getInputText( ), 'input_text')
},
updateText: function(val) {
   const block = this.getSourceBlock( )
   if (block._data) {
      if (val) {
         block._data.text[block._data.lang] = val
      } else {
         delete block._data.text[block._data.lang]
      }
   }
},
updateLang: function(val) {
   const block = this.getSourceBlock( )
   if (block._data) {
      block._data.lang = val
      const text = block.getInputText( )
      block.setFieldValue(text, 'input_text')
      if (!text) {
         delete block._data.text[val]
      }
   }
},
toggleOptions: function ( ) {
   this._data.show_options = !this._data.show_options
   this.reshape( )
},
getInputText: function( ) {
   return this._data.text[this._data.lang] || ''
}
}
const flow_speak = {
   type: 'flow_speak',
   message0: 'Play prompt %1 %2 %3 %4 %5',
   args0: [{
      type: 'input_dummy'
   },
   {
      type: 'field_text_box',
      name: 'input_text',
      text: ''
   },
   {
      type: 'field_dropdown',
      name: 'lang',
      options: obj.langs
   },
```

| Smart Block Components Source Code (by way of example) |
|---|

```
      {
        type: 'field_checkbox',
        name: 'dial_ahead',
        checked: true
      },
      {
        type: 'field_checkbox',
        name: 'flush_dtmf',
        checked: true
      }],
      inputsInline: true,
      previousStatement: obj.check,
      nextStatement: obj.check,
      serialized: serialize(obj),
      mutator: 'flow_speak_mutator',
      colour: obj.colour,
      tooltip: 'Play audio prompt',
      category: 'Audio Prompt'
  }
  module.exports = flow_speak
  /************************/
  /* time block */
  /************************/
  /* eslint-disable */
  'use strict'
  const serialize = require('serialize-javascript')
  module.exports = async function (account = { }) {
    const obj = {
      type: 'flow_time',
      label: 'time',
      delimiter: ':',
      tooltip: 'Compare to the current time',
      colour: '#43B0F1',
      category: 'Time & Date',
      md: [
        ['AM', 'AM'],
        ['PM', 'PM'],
        ['24H', '24H']
      ],
      options: [
        [
          '=',
          '==='
        ],
        [
          '≠',
          '!=='
        ],
        [
          '>',
          '>'
        ],
        [
          '<',
          '<'
        ],
        [
      _data: {
        PROFILE_MD: account.profile.timeFormat === '24H' ? '24H' : null,
        MD: null
      },
      init: function ( ) {
        this.setColour(this.colour)
        this.setOutput(true, 'Boolean')
        this.setTooltip(this.tooltip)
        this.appendDummyInput('MAIN')
          .appendField(this.label)
          .appendField(new Blockly.FieldDropdown(this.options), 'OPERATOR')
          .appendField(new Blockly.FieldNumber(0, 0), 'HOUR')
          .appendField(this.delimiter)
          .appendField(new Blockly.FieldNumber(0, 0, 59, null), 'MINUTE')
          .appendField(new Blockly.FieldDropdown(this.md, this.setMD.bind(this)),
  'MD')
        this.setFieldValue(this._data.MD || this._data.PROFILE_MD, 'MD')
      },
      setMD: function (val) {
        this._data.MD = val
```

| Smart Block Components Source Code (by way of example) |
|---|

```
        const HOUR = this.getField('HOUR')
        HOUR.setMax(val === '24H' ? 23 : 12)
        return val
      }
    }
    return {
      type: 'flow_time',
      message0: '${obj.label} %1 %2 ${obj.delimiter} %3 %4',
      args0: [{
        type: 'field_dropdown',
        name: 'OPERATOR',
        options: obj.options
      }, {
        type: 'field_number',
        name: 'HOUR',
        value: 0,
        min: 0,
        max: 23
      }, {
        type: 'field_number',
        name: 'MINUTE',
        value: 0,
        min: 0,
        max: 59
      }, {
        type: 'field_dropdown',
        name: 'MD',
        options: obj.md
      }],
      serialized: serialize(obj),
      output: 'Boolean',
      colour: obj.colour,
      tooltip: obj.tooltip,
      category: obj.category
    }
}
/**************************/
/*      pause block       */
/**************************/
'use strict'
const CHECK = ['flow', 'flow_timeout']
module.exports = {
  type: 'flow_timeout',
  message0: 'pause: %1 seconds',
  args0: [{
    type: 'field_number',
    name: 'delay',
    value: 5,
    min: 1,
    max: 60
  }],
  previousStatement: CHECK,
  nextStatement: CHECK,
  colour: '#76B947',
  tooltip: 'Pause call flow',
  category: 'Call Flow'
}
```

| Smart Block Scenarios Source Code |
|---|

```
/******************/
/* answer block */
/******************/
/* eslint-disable */
'use strict'
const Blockly = require('node-blockly/js')
module.exports = (block) => {
    const code = `
        await answer( )
    `
    return code
}
/******************/
/* date block */
```

Smart Block Scenarios Source Code

```
/******************/
/* eslint-disable */
'use strict'
const Blockly = require('node-blockly/js')
module.exports = (block) => {
   const date = block.getFieldValue('VAR')
   const operator = block.getFieldValue('OPERATOR')
   const code =
   `
     (
        lib.DateTime.fromFormat('${date}', 'L/d/yyyy')
          .setZone(run.user.profile.timeZone).startOf('day').ts
        ${['===', '!==', '>', ''].includes(operator) ? operator : ' === '}
        lib.DateTime.local().setZone(run.user.profile.timeZone).startOf('day').ts
     )
   `
   return [code, Blockly.JavaScript.ORDER_NONE]
}
/******************/
/* day of week block */
/******************/
/* eslint-disable */
'use strict'
const Blockly = require('node-blockly/js')
module.exports = (block) => {
   const weekday = parseInt(block.getFieldValue('VAR'), 10)
   const operator = block.getFieldValue('OPERATOR') == 'true'
   const code =
   `
      (
         lib.DateTime.local().setZone(run.user.profile.timeZone).weekday ===
${ weekday } === ${operator}
      )
   `
   return [code, Blockly.JavaScript.ORDER_NONE]
}
/******************/
/* transfer to block */
/******************/
/* eslint-disable */
'use strict'
const Blockly = require('node-blockly/js')
module.exports = (block) => {
   const account = block.getFieldValue('account') | ''
   const code =
   `
     await bridge({
        caller_number: event.srcNumber,
        accountUid:    '${account}'
     })
   `
   return code
}
/******************/
/* hang up block */
/******************/
/* eslint-disable */
'use strict'
const Blockly       = require('node-blockly/js')
module.exports = (block) => {
   const code = `
     await hangup( )
   `
   return code
}
/******************/
/* holiday day block */
/******************/
/* eslint-disable */
'use strict'
const Blockly = require('node-blockly/js')
module.exports = (block) => {
   const operator = (block.getFieldValue('OPERATOR') === ' === ') ? '': '!'
   const country = block.getFieldValue('COUNTRY') || 'US'
   const code = `
      (( ) => {
         const dt = new lib.DateHolidays('${ country }')
         let holiday = dt.isHoliday(lib.DateTime.utc( ))
         if (holiday) {
```

| Smart Block Scenarios Source Code |
|---|

```
            holiday = holiday.find(i => i.type === 'public')
         }
         return $ { operator} !! holiday
      })( )
`
   return [code, Blockly.JavaScript.ORDER_NONE]
}
/******************/
*/ menu block */
/******************/
/* eslint-disable */
'use strict'
const Blockly = require('node-blockly/js')
const Formatter = require('js-beautify').js
const crypto = require('crypto')
const createId = function(input) {
   return `id_${crypto
      .createHash('sha256')
      .update(input)
      .digest('hex')
      .substring(0, 10)}`
}
module.exports = (block) => {
   const id = createId(block.id)
   const input_timeout = block.getFieldValue('input_timeout')
   const tag = block.tag
   const timeout = Math.min(Math.abs(parseInt(input_timeout, 10)) || 5, 120) * 1000
   const attempts = parseInt(block.getFieldValue('attempts'), 10)
   const children = block.getChildren( )
   const options = new Map( )
   for (let child of children) {
      while (child) {
         if (child.type === 'flow_ivr_option') {
            options.set(child.getFieldValue('option'),
Blockly.JavaScript.statementToCode(child, 'options'))
         } else if (child.type === 'flow_ivr_extension') {
            const { rows } = child
            rows && rows.forEach((i) => options.set(i.ext,
               await bridge({
                  caller_number: event.srcNumber,
                  accountUid:       '${i.account}'
               })
            `))
         }
         child = child.getNextBlock( )
      }
   }
   const optionsCode = [ ]
   for (const [key, val] of options) {
      optionsCode.push(`
         case '${key}':
            $ {val}
            break
      `)
   }
   const promtsCode = Blockly.JavaScript.statementToCode(
      block,
      'prompts_statement'
   )
   let main_id = null
   let parent_id = null
   let _block = block
   while (_block) {
      _block = _block?.getSurroundParent()
      if (_block?.type === 'flow_ivr') {
         const block_id = createId(_block.id)
         if (!parent_id) {
            parent_id = block_id
         }
         if (_block.tag) {
            main_id = createId(_block.id)
            break
         }
      }
   }
   const code = `
      const $ {id} = {
```

| Smart Block Scenarios Source Code |
|---|

```
            parent: ${parent_id},
            main: ${main_id},
            tag: ${tag},
            options: ${JSON.stringify([...options.keys( )]).replace(/"/g, "\"")},
            timeout: ${timeout},
            attempts: ${attempts},
            count: 0,
            f: async function ( ) {
                while (this.count < this.attempts) {
                    if (run.restart) break
                    ${ promtsCode }
                    const preserved = run.DTMF.join('')
                    const { data, errCode } = await ivr(
                        this.options,
                        { timeout: this.timeout, preserved }
                    )
                    if ([0, 3].includes(errCode) && data) {
                        this.count = 0
                        switch (data) {
                            ${optionsCode.join('')}
                        }
                        break
                    }
                    if ([1, 2, 3].includes(errCode)) {
                        this.count++
                    }
                    if (errCode === 3) {
                        ${Blockly.JavaScript.statementToCode(block, 'timeout_statement') }
                        break
                    }
                    if ([1, 2].includes(errCode)) {
                        ${Blockly.JavaScript.statementToCode(block, 'exception_statement')}
                        break
                    }
                    break
                }
            }
        }
        await ${id} .f( )
        if (run.restart) {
            continue
        }
    `
    return Formatter(code, { preserve_newlines: false })
}
/******************/
/* option block */
/******************/
/* eslint-disable */
'use strict'
const Blockly = require('node-blockly/js')
module.exports = (block) => {
    const code = Blockly.JavaScript.statementToCode(block, 'options')
    return code
}
/******************/
/* extensions block */
/******************/
/* eslint-disable */
'use strict'
const Blockly = require('node-blockly/js')
module.exports = (block) => {
    const code = `
        // flow_ivr_extension
    `
    return code
}
/******************/
/* restart block */
/******************/
/* eslint-disable */
'use strict'
const Blockly = require('node-blockly/js')
const SCRIPT = `
    run.restart = true
    continue
`
```

| Smart Block Scenarios Source Code |
| --- |

```
const MAIN_MENU = `
  return (this.main || this).f( )
`
const PREVIOUS_MENU =
  return (this.parent || this.main || this).f( )
`
const CURRENT_MENU = `
  continue
`
const options = new Map([
  ['SCRIPT', SCRIPT],
  ['MAIN_MENU', MAIN_MENU],
  ['PREVIOUS_MENU', PREVIOUS_MENU],
  ['CURRENT_MENU', CURRENT_MENU]
])
module.exports = (block) => {
  const kind = block.getFieldValue('kind')
  const code = options.get(kind) || options.get('SCRIPT')
  return code
}
/******************/
/* set language block */
/******************/
/* eslint-disable */
'use strict'
const Blockly = require('node-blockly/js')
const languages = require('../../utils/vars/languages')
module.exports = (block) => {
  const lang = block.getFieldValue('lang')
  const _lang = languages.get(lang)
  if (!_lang) {
    return ''
  }
  const code = `
    run.lang = '${ lang}'
  `
  return code
}
/******************/
/* play prompt block */
/******************/
/* eslint-disable */
'use strict'
const Blockly = require('node-blockly/js')
const Utils = require('../../utils')
const qmap = require('../../../queue')
module.exports = (block) => {
  const { _data: data } = block
  if (!data || !data.text) {
    return ''
  }
  const q = qmap.get('tts')
  if (!q) {
    return ''
  }
  const opt = { }
  for (const [key, val] of Object.entries(data.text)) {
    const text = Utils.getSSMLText(val)
    opt[key] = text
    q.add({
      lang: key,
      text
    }, {
      removeOnComplete: true,
      removeOnFail: true
    })
  }
  const dial_ahead = data.options?.find(i => i.name === 'dial_ahead')?.value
  const flush_dtmf = data.options?.find(i => i.name === 'flush_dtmf')?.value
  const code = `
    await speak(${JSON.stringify(opt)}, ${dial_ahead}, ${flush_dtmf})
  `
  return code
}
/******************/
*/ time block */
/******************/
```

| Smart Block Scenarios Source Code |
|---|

```
/* eslint-disable */
'use strict'
const Blockly = require('node-blockly/js')
module.exports = (block) => {
   const md = block.getFieldValue('MD')
   const full = md === 'PM'
   const hour = parseInt(block.getFieldValue('HOUR'), 10) + ( full ? 12 : 0)
   const minute = parseInt(block.getFieldValue('MINUTE'), 10)
   const _op = block.getFieldValue('OPERATOR')
   const op = [' === ', '!== ', '>', '<'].includes(_op) ? _op : '==='
   const code = `
      (( ) =>
         {
            const now = lib.DateTime.local( ).setZone(run.user.profile.timeZone).set({
               second: 0, millisecond: 0
            })
            const check = now.set({ hour: ${hour}, minute: ${minute} })
            return now.ts $ {op} check.ts
         }
      ) ( ) `
      return [code, Blockly.JavaScript. ORDER_NONE]
}
/******************/
/* pause block */
/******************/
/* eslint-disable */
'use strict'
const Blockly = require('node-blockly/js')
module.exports = (block) => {
   const delay = parseInt(block.getFieldValue('delay'), 10) || 0
   const milliseconds = delay * 1000
   const code = `
      await new Promise(resolve => setTimeout(resolve, ${milliseconds}))
   `
   return code
}
```

Figure 8:
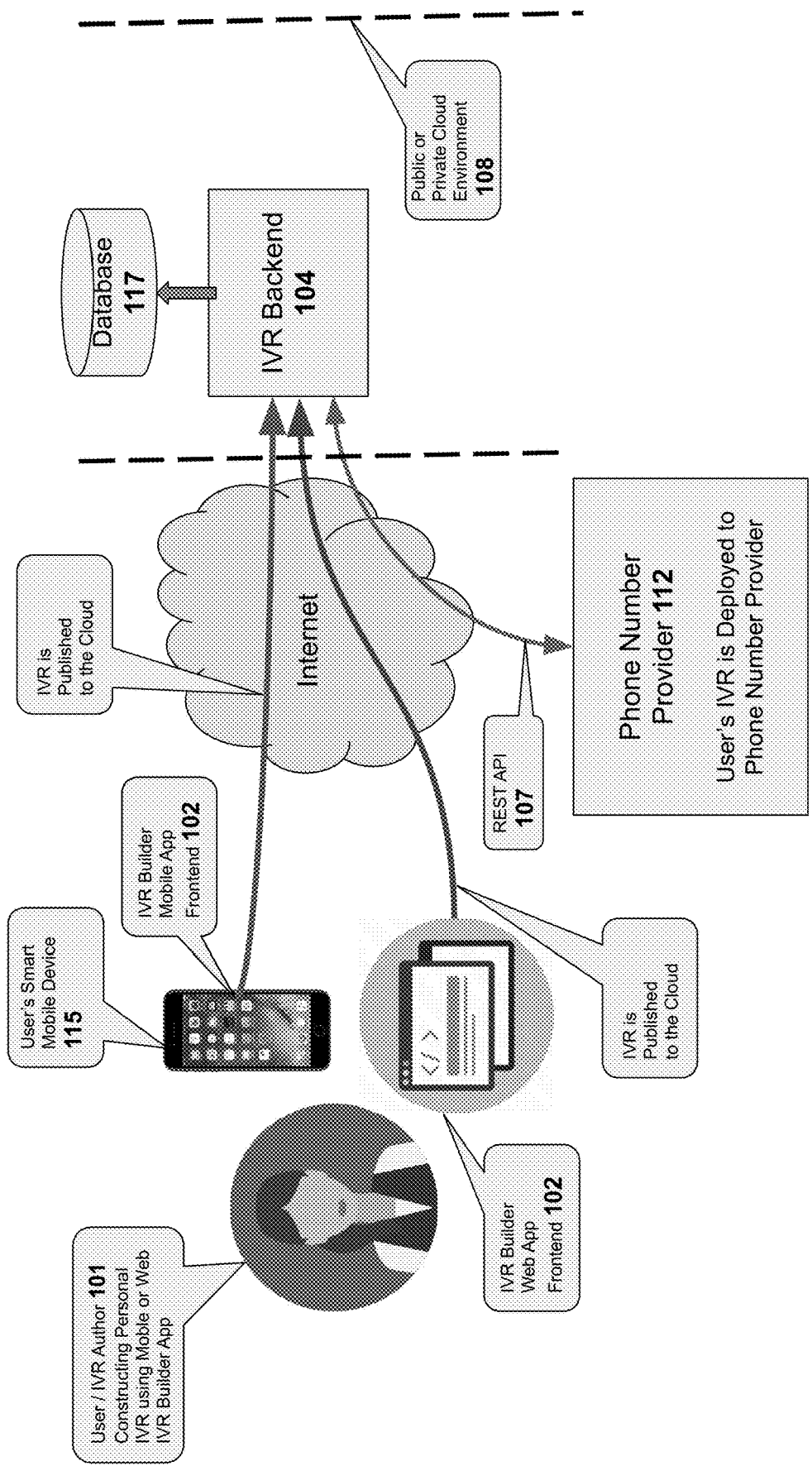
FIG. 8 is a block diagram illustrating a user-initiated, personal, error-free IVR construction process for phone number provider deployment according to one embodiment of the present invention.

Referring now to FIG. 8, in another embodiment of the current invention illustrated, any individual user may become the IVR Author 101. Further, as illustrated in FIG. 8, any user may perform the IVR application construction using an intuitive, error-free IVR builder running as a web application 102 in any standard web browser, or as a Mobile Application 102 running on a user's smart mobile device 115. As illustrated on FIG. 8, IVR Author 101 can publish the completed IVR application to the IVR Backend 104 which can be deployed in any public or private cloud environment 108. This embodiment of the present invention also involves the deployment of an IVR API 107 handler component to the user's Phone Number provider 112 (such as landline or mobile carrier, or other phone number providers) network.

Referring now to FIG. 9, an example runtime environment illustrates the personal, error-free, IVR program constructed by any individual user 101 while running by the user's Phone Number Provider 112. This use case flow starts with a PSTN Caller 110 dialing the user 101 telephone number. The call arrives to the telephone number provider 112 where the IVR API component 108 initiates communicating with the IVR backend to determine if the IVR application should be invoked on this call based on the User 101 configured call handling rules (e.g., block, pass-through, or run IVR on select calls). If a determination is made that the IVR application must be run, then the IVR API component 108 continues to communicate to the IVR Backend via REST API/Websocket or other suitable protocols to actually run the IVR application using the telephone number provider 112 resources. Based on the caller 110 inputs that are registered, the IVR application either transfers the call to the user 101 voicemail, or to the mobile device 115 or their office or home phone 116.

In yet another embodiment of the current invention, any individual user may become the IVR Author 101 and, as shown in FIG. 10, may perform construction of an IVR application, using an intuitive, error-free IVR builder running as a web application 102 in any standard web browser, or as a mobile application 102 running on the user's smart mobile device 115. As illustrated on FIG. 10, the IVR Author 101 may publish the completed IVR application to the IVR backend 104, which may be deployed in any public or private cloud environment 108.

As shown in FIG. 11, the illustrated embodiment of the present invention permits the IVR Builder Mobile Application 102 to also run the completed IVR application by communicating to the IVR Backend 104 deployed in any Public or Private Cloud 108. This use case flow that is illustrated starts or commences with a PSTN or VOIP caller 110 dialing a telephone number of the user 101 to initiate a call or communication over the PSTN or VoIP network provided by VoIP or a telephone number provider 112. The call arrives at the IVR mobile application 102 running on the user's smart mobile device 115. The IVR mobile application 102 communicates via REST API/Websocket 108 or other suitable protocols with the IVR backend to determine if the IVR application should be invoked on this call based on the user 101 configured call handling rules (e.g., block, pass-through or run IVR on select calls). If a determination is made that the IVR application must be run, the IVR mobile application 102 continues to communicate to the IVR backend to actually run the IVR application.

Example components of a device that may operate within the environment shown in the figures are described. For example, an IVR author 101 may use a device that corresponds to any of various network devices (e.g., an IVR computer, a computer-telephony integrated ("CTI") computer, a user phone, gateways, etc.). Each of these devices may include one or more of the components described here.

An example device may include a bus, a processor (e.g., microprocessor, FPGA. ASIC, etc.), a memory (e.g., RAM. ROM, etc.), an input device (e.g., a keyboard, etc.), an output device (e.g., a monitor, etc.), and a communication interface (e.g., a wired, wireless, etc.). However, in other implementations, a device may include fewer components, additional components, different components, or differently arranged components than those illustrated in the drawings.

A bus may include one or more component subsystems and/or communication paths to enable communications among the components of the device. The processor may include one or more processors, microprocessors, data processors, co-processors, network processors, application-specific integrated circuits (ASICs), controllers, programmable logic devices (PLDs), chipsets, field-programmable gate arrays (FPGAs), or other types of components that may interpret or execute instructions or data. The processor indicated above may control the overall operation, or a portion thereof, of the device, based on, for example, an operating system and/or various applications. The processor may access instructions from the memory, from other components or from a source external to the device (e.g., a network or another device). In one example, these instructions may control the IVR computer to prompt the customer for input, register with the CTI, and provide call-back to the customer. In another example, these instructions may control the CTI computer to monitor the call center for the call event, and notify the IVR computer when the agent has connected to the monitored phone call.

The memory used may include memory and/or secondary storage. For example, the memory may include random access memory (RAM), dynamic RAM (DRAM), read-only memory (ROM), programmable ROM (PROM), flash memory, or some other type of memory. The memory may include a hard disk (e.g., a magnetic disk, an optical disk, a magneto-optic disk, a solid-state disk, etc.) or some other type of computer-readable medium, along with a corresponding drive. A computer-readable medium may be defined as a non-transitory memory device. A memory device may include space within a single physical memory device or spread across multiple physical memory devices. The programming instructions of the IVR computers, CTI computer, etc. may be stored in these memory elements for the respective devices.

In one example, when the device is a telephone, phone or computer of the IVR author/customer attempting to connect with the IVR computer, the input device may include one or more components that permit the IVR author/customer to input information into the device. For example, the input device may include a keypad, a button, a switch, a knob, fingerprint recognition logic, retinal scan logic, a web cam, voice recognition logic, a touchpad, an input port, a microphone, a display, or some other type of input component. The output device may include one or more components that permit the device to output information to a user. For example, the output device may include a display, light-emitting diodes (LEDs), an output port, a speaker, or some other type of output component.

The communication interface may include one or more components that permit the device to communicate with other devices or networks. For example, the communication interface may include some type of wireless or wired interface. The communication interface may also include an antenna (or a set of antennas) that permit wireless communication, such as the transmission and reception of radio frequency (RF) and/or optical signals. The communications interface may additionally or alternatively support a wired connection, for example, an Ethernet connection to a wired portion of the network. The communication interface may include multiple digital transceivers, for communicating with multiple access networks. These interfaces may allow the CTI computer and IVR computers to communicate with each other, and with other network devices such as the gateways, control servers, call center, etc. Essentially, each network device may use an interface to send and receive the various messages shown.

As described herein, the device may perform certain operations in response to the processor executing software instructions contained in a computer-readable medium, such as memory. The software instructions may be read into the memory from another computer-readable medium or from another device via the communication interface. The software instructions contained in the memory may cause the processor to perform one or more processes described herein. Alternatively, hardwired circuitry may be used in place of, or in combination with, software instructions to implement processes described herein. Thus, implementations described herein are not limited to any specific combination of hardware circuitry and software.

For example, in operation, the processor may instruct the IVR computer to prompt the customer with voice prompts, place a proxy call to the call center on behalf of the customer, register with the CTI computer and call-back the customer when receiving the notification from the CTI computer. In another example, the processor may instruct the CTI computer to monitor the call from the IVR computer in the queue, and notify the IVR computer when an agent has connected to the call in the queue.

In one example, the IVR computers may include an IVR processor, an IVR communication interface and an IVR memory having programming instructions stored thereon. Likewise, the CTI may include a CTI processor, CTI communication interface and CTI memory having programming instructions stored thereon. During operation, the IVR processor may perform the various operations described above with respect to receiving calls from customers, placing calls to customers, registering with the CTI computer, etc. based on the programming instructions stored in the IVR memory. These various operations are generally performed with the other network devices via the IVR communication interface. Likewise, during operation, the CTI processor may perform the various operations described above with respect to receiving registration from the IVR computer, monitoring the IVR call in the call center queue, providing notification to the IVR computer, etc., based on the programming instructions stored in the CTI memory. These various operations are generally performed with the other network devices via the CTI communication interface.

The various functions of the overall IVR based system shown in the figures (e.g., IVR, decision engine, desktop integration, data source teams, command center, IVR utilities, ICM, ACD, etc.) and described above may be implemented in digital electronic circuitry, in computer software, firmware or hardware (e.g., microprocessor, ASIC. FPGA, RAM, ROM, etc.). The techniques may be implemented using one or more computer program products. Programmable processors and computers may be included in or packaged as mobile devices. The processes and logic flows may be performed by one or more programmable processors and by one or more programmable logic circuits. General and special purpose computing devices and storage devices may be interconnected through communication networks.

A server, for example, includes a data communication interface for packet data communication. The server also includes a central processing unit ("CPU"), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Hence, aspects of the IVR-related techniques outlined in this disclosure are embodied in programming as illustrated by the source code above, for example, for execution by processors of an IVR computer or a CTI computer. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into another computer platform. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the IVR-related techniques discussed in this disclosure. Volatile storage media include dynamic memory, such as main memory of such a computer platform. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer," "server," "processor," and "memory" all refer to electronic or other technological devices. These terms exclude people or groups of people. Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer-readable media include, but are not limited to, CD-ROMs, flash drives, RAM chips, hard drives. EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software inventions can be implemented as sub-parts of a larger program while remaining distinct software inventions. In some implementations, multiple software inventions can also be implemented as separate programs. Finally, any combination of separate programs that together implement a software invention described here is within the scope of the invention. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is understood that any specific order or hierarchy of steps in the processes disclosed is an illustration of example approaches. Based upon design preferences, it is understood that the specific order or hierarchy of steps in the processes may be rearranged, or that all illustrated steps be performed.

Some of the steps may be performed simultaneously. For example, in certain circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects.

What is claimed is:

1. An interactive voice response construction system, comprising:
    a processor;
    a memory coupled to the processor and storing executable code to drive the processor to cause the processor to perform a plurality of control functions within the interactive voice response construction system to construct a voice response application;
    a graphical user interface coupled to the processor and the memory, and operable by a constructing user to execute one or more visually intuitive control actions to set up a plurality of interlocking building blocks into a single assembly presenting a visual representation of an interactive voice response flow on a display, wherein the plurality of interlocking building blocks is configurable by one or more underlying software algorithms that perform one or more selectable functions, the plurality of interlocking building blocks interoperable to verify that a selectable function of each block is performed in an order and within an underlying framework defining parameters that verify if the interactive voice response flow meets a valid sequence, wherein the plurality of interlocking building blocks allow the constructing user to insert at least one of the plurality of interlocking building blocks into another one of the plurality of interlocking blocking to interlock them, wherein a built-in error-prevention mechanism operable during a construction process enables the interlocking building blocks to interlock only in accordance with a combination that meets the valid sequence and in an instance that the combination does not meet the valid sequence, the built-in error-prevention mechanism provides an immediate visual feedback notification to the constructing user, thereby allowing the constructing user to easily identify and immediately correct a mistake, the plurality of interlocking building blocks operable within a web or mobile application operating on a device of the constructing user, wherein the constructing user invokes certain functions within the graphical user interface and a construction system to convert a constructed assembly of plurality of interlocking building blocks into an interactive voice response script upon validation, the interactive voice response script being executable within at least one of a cloud server, a computer web browser and the mobile application operating on a device of an end user;
    wherein the blocks within the plurality of interlocking building blocks assembly couple to machine learning algorithms and artificial intelligence models trained by continuous usage data sets gathered from executing the interactive voice response script by the end user; and
    a smart interactive voice response menu block coupled to an underlying artificial-intelligence large language model, wherein the underlying artificial-intelligence model detects an error in the end user response if the end user response is not within a scope of an expected response of the menu block and generates an error message to the end user.

2. The interactive voice response construction system according to claim 1, wherein the plurality of interlocking building blocks operate within a web-based browser operating on a personal computer.

3. The interactive voice response construction system according to claim 1, wherein at least one of the plurality of interlocking building blocks includes a transfer block within it and enables an interactive voice response script operation within at least one of a cloud server, a computer browser and the mobile application operating on the device of the end user, and wherein upon an exit from or suspension of the interactive voice response script being initiated, a call transfer is executed from the device to a requested destination by the end user.

4. The interactive voice response construction system according to claim 3, wherein at least one of the blocks within the plurality of interlocking building blocks enables generation of the interactive voice response script.

5. The interactive voice response construction system according to claim 4, wherein at least one of the blocks within the plurality of interlocking building blocks is designed to enable the interactive voice response script according to one or more rules and parameters of the at least one block.

6. The interactive voice response construction system according to claim 1, wherein the plurality of interlocking building blocks operate within a web-based browser operating on a user's personal computer, wherein a constructing user invokes certain functions within the graphical user interface to select certain of the plurality of interlocking building blocks to create a web-based interactive voice response call flow and the interactive voice response script and wherein the constructing user provides data to the plurality of interlocking building blocks, wherein the data is configured to enable the underlying artificial intelligence large language model to execute a dialog with an end user who initiated the interactive voice response script.

7. The interactive voice response construction system according to claim 6, wherein at least one of the blocks within the plurality of interlocking building blocks enables generating the interactive voice response script.

8. The interactive voice response construction system according to claim 7, wherein at least one of the blocks within the plurality of interlocking building blocks is designed to enables generating the interactive voice response script according to rules and parameters of the at least one block.

9. The interactive voice response construction system according to claim 8, wherein the blocks coupled to machine learning algorithms and models trained by data sets compiled by continuous use by end users.

10. The interactive voice response construction system according to claim 1, wherein the blocks within the plurality of interlocking building blocks are coupled to machine learning algorithms and artificial intelligence models trained from dynamic data sources.

11. The interactive voice response construction system, according to claim 1, wherein the graphical user interface includes a plurality of drag-and-drop type graphical components.

12. The interactive voice response construction system according to claim 1, further comprising a smart interactive voice response application programming interface (API) block that initiates a web request to an external application programming interface (API) endpoint and processes a response by the processor and captures a result in a variable block.

13. A method, comprising:
in an interactive voice response construction application, storing executable code stored in a memory to drive a processor, to cause the processor to execute a plurality of control actions, further comprising:
providing a graphical user interface operable by a constructing user to execute one or more visually intuitive control actions to configure a plurality of interlocking building blocks into a single assembly presenting a visual representation of an interactive voice response flow, wherein the plurality of interlocking building blocks is configurable by one or more underlying software algorithms that perform one or more selectable functions;
operating the plurality of interlocking building blocks by an underlying software algorithm to perform one or more selectable functions, the plurality of interlocking building blocks interoperable to verify that the selectable function of each block is performed in an order and within an underlying framework defining parameters that verify if the interactive voice response flow meets a valid sequence, wherein the plurality of interlocking building blocks allow the constructing user to insert at least one of the plurality of interlocking building blocks into another one of the plurality of interlocking blocking to interlock them, wherein the plurality of interlocking building blocks have a built-in error prevention mechanism operable during the construction process to enable the interlocking building blocks to interlock only in accordance with a combination that meets the valid sequence and in an instance that the combination is not met, the built-in error-prevention mechanism provides an immediate visual feedback notification to the constructing user, thereby allowing the constructing user to easily identify and immediately correct a mistake;
configuring the order and framework to eliminate errors by users, wherein the plurality of interlocking building blocks operate within a web or mobile application operating on a device of the constructing user, wherein the constructing user invokes certain functions within the graphical user interface and the construction system to convert a constructed assembly of certain interlocking blocks into an interactive voice response script upon validation, the interactive voice response script executable within at least one of a cloud server, a computer web browser and the mobile application operating on a device of an end user;
coupling the blocks within the plurality of interlocking building blocks assembly to machine learning algorithms and artificial intelligence models trained by continuous usage data sets compiled gathered from executing the interactive voice response script by the end user;
providing an action, via the plurality of interlocking building blocks to build the interactive voice response script within restrictions of each of the plurality of interlocking building blocks; and
coupling a smart interactive voice response menu block to an underlying artificial-intelligence large language model, wherein the underlying artificial-intelligence model detects an error in the end user response if the end user response is not within a scope of an expected response of the menu block and generates an error message to the end user.

14. The method according to claim 13, wherein the plurality of interlocking building blocks operates within a web-based browser operating on a personal computer.

15. The method according to claim 13, wherein at least one of the plurality of interlocking building blocks includes a transfer block within it and enables an interactive voice response script operation within at least one of a cloud server, a computer browser and the mobile application operating on the device of the end user, and wherein upon an exit from or suspension of the interactive voice response script being initiated, a call transfer is executed from the device to a requested destination by the end user.

16. The method according to claim 13, wherein at least one of the blocks within the plurality of interlocking building blocks enables generation of the interactive voice response script.

17. The method according to claim 16, wherein at least one of the blocks within the plurality of interlocking building blocks enables the interactive voice response script according to one or more rules and parameters of the at least one block.

18. The method according to claim 13, wherein the plurality of interlocking building blocks operates within a web-based browser operating on a personal computer of the constructing user, wherein the constructing user invokes certain functions within the graphical user interface to select certain of the plurality of interlocking building blocks to create a web-based interactive voice response call flow and the interactive voice response script and wherein the constructing user provides data to the plurality of interlocking building blocks, wherein the data enables the underlying intelligence large language models to execute a dialog with an end user who initiated the interactive voice response script.

19. The method according to claim 18, wherein at least one of the blocks within the plurality of interlocking building blocks enables generating the interactive voice response script.

20. The method according to claim 18, wherein the blocks coupled to machine learning algorithms and artificial intelligence models are trained by data sets compiled by continuous use by end users or dynamic data sources and wherein a smart interactive voice response API block that initiates a web request to an external API endpoint and processes a response by the processor and captures a result in a variable accessible within an assembly of blocks.

* * * * *